United States Patent
Frenger et al.

(10) Patent No.: US 10,979,966 B2
(45) Date of Patent: Apr. 13, 2021

(54) RADIO NETWORK NODES, WIRELESS DEVICE AND METHODS PERFORMED THEREIN

(71) Applicant: TELEFONAKTIEBOLAGET LM ERICSSON (PUBL), Stockholm (SE)

(72) Inventors: Pål Frenger, Linköping (SE); Christofer Lindheimer, Linköping (SE); Martin Hessler, Linköping (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 218 days.

(21) Appl. No.: 16/081,520

(22) PCT Filed: Jun. 11, 2018

(86) PCT No.: PCT/SE2018/050601
§ 371 (c)(1),
(2) Date: Aug. 31, 2018

(87) PCT Pub. No.: WO2018/231129
PCT Pub. Date: Dec. 20, 2018

(65) Prior Publication Data
US 2019/0364488 A1    Nov. 28, 2019

Related U.S. Application Data

(60) Provisional application No. 62/519,899, filed on Jun. 15, 2017.

(51) Int. Cl.
*H04W 48/12* (2009.01)
*H04W 76/11* (2018.01)
(Continued)

(52) U.S. Cl.
CPC ....... *H04W 48/12* (2013.01); *H04W 72/1242* (2013.01); *H04W 74/0833* (2013.01); *H04W 76/11* (2018.02); *H04W 84/042* (2013.01)

(58) Field of Classification Search
CPC combination set(s) only.
See application file for complete search history.

(56) References Cited

U.S. PATENT DOCUMENTS

| 8,155,684 B2 | 4/2012 | Agulnik et al. |
| 2012/0264428 A1* | 10/2012 | Lecompte ............. H04W 48/18 455/435.1 |

(Continued)

FOREIGN PATENT DOCUMENTS

EP    3094137 A1    11/2016

OTHER PUBLICATIONS

Xiaomi, "Visibility of Slicing to UE", 3GPP TSG-RAN WG2#97bis, R2-1702529, Apr. 3-7, 2017, Spokane, Washington, pp. 1-4. (Year: 2017).*

(Continued)

*Primary Examiner* — Andrew Lai
*Assistant Examiner* — Sumitra Ganguly
(74) *Attorney, Agent, or Firm* — Patent Portfolio Builders PLLC

(57) ABSTRACT

Embodiments herein relate to e.g. a method performed by a first radio network node for handling communication of a wireless device in a wireless communication network comprising at least a first cell and a second cell configured over at least partly a same bandwidth. The first radio network node transmits a first SI over the first cell, wherein the first SI comprises one or more network IDs and one or more access configurations for the one or more network IDs, and wherein the one or more network IDs are associated to a service that is prioritized over other services.

27 Claims, 17 Drawing Sheets

(51) Int. Cl.
*H04W 72/12* (2009.01)
*H04W 74/08* (2009.01)
*H04W 84/04* (2009.01)

(56) References Cited

U.S. PATENT DOCUMENTS

| | | |
|---|---|---|
| 2014/0098761 A1 | 4/2014 | Lee et al. |
| 2014/0161056 A1* | 6/2014 | Moulsley ............ H04W 72/042 370/329 |
| 2015/0282150 A1* | 10/2015 | Nigam .............. H04W 28/0278 370/329 |
| 2016/0234735 A1* | 8/2016 | Kubota ................. H04W 48/14 |
| 2017/0079059 A1* | 3/2017 | Li ......................... H04W 16/02 |
| 2017/0086118 A1* | 3/2017 | Vrzic .................... H04W 36/26 |
| 2017/0208538 A1* | 7/2017 | Cao ....................... H04W 48/16 |
| 2017/0245295 A1 | 8/2017 | Jung et al. |

OTHER PUBLICATIONS

International Preliminary Report on Patentability in corresponding/related International Application No. PCT/SE2018/050601 dated Sep. 11, 2019. (References not cited herewith have been previously made of record.).

Nokia, "Idle UE procedures impact", 3GPP TSG-RAN WG2 Meeting #97bis, R2-1703198, Apr. 3-7, 2017, Spokane, Washington.

Suresh Borkar et al., "Priority Access for Public Safety on Shared Commercial LTE Networks", 2011 Technical Symposium at ITU Telecom World, Oct. 24-27, 2011, pp. 105-110.

Xiaomi, "Visibility of Slicing to UE", 3GPP TSG-RAN WG2 #97bis, R2-1702529, Apr. 3-7, 2017, Spokane, Washington, pp. 1-4.

ZTE, "Consideration on the System Information in NR", 3GPP TSG-RAN WG2 Meeting #94, R2-163743, May 23-27, 2016, Nanjing, China.

\* cited by examiner

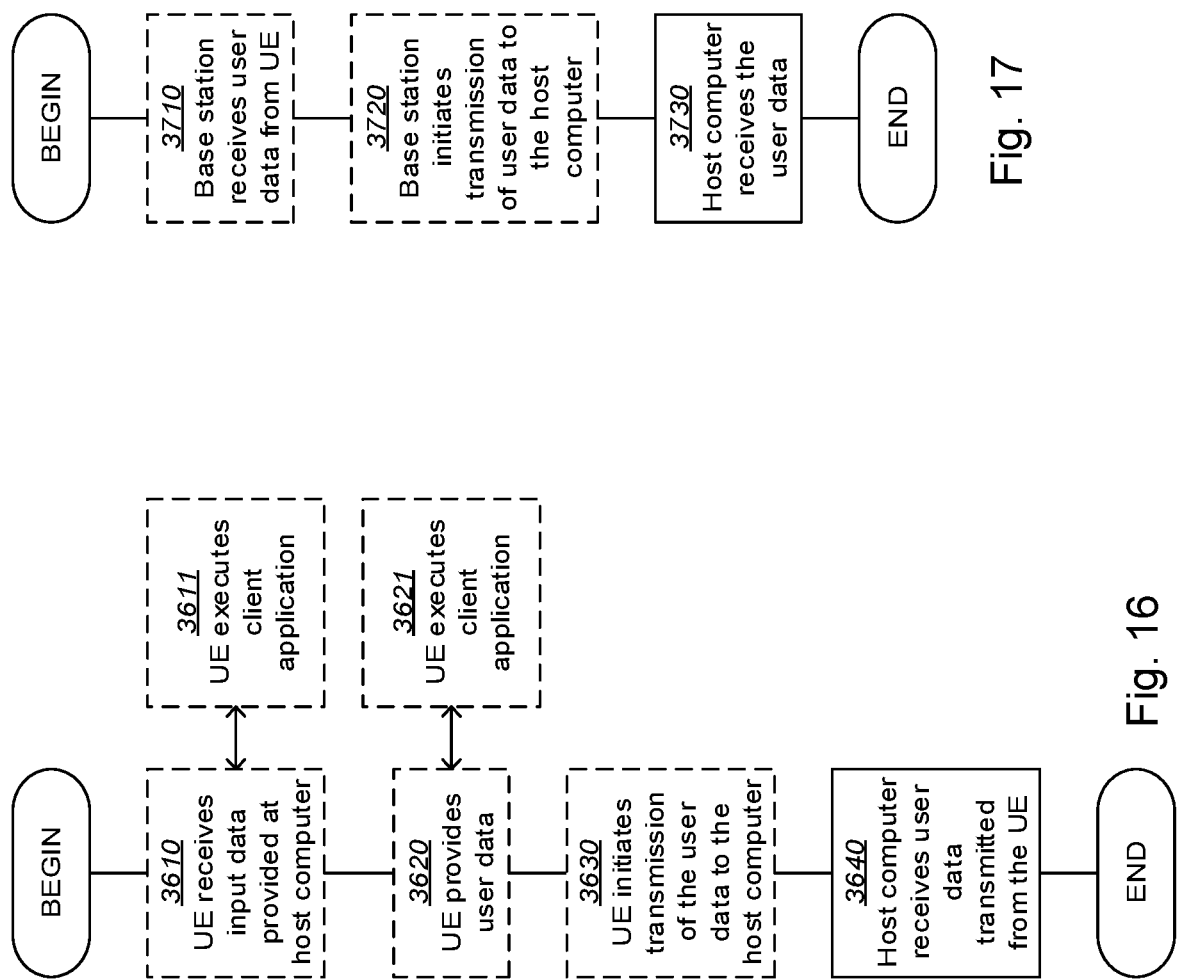

RADIO NETWORK NODES, WIRELESS DEVICE AND METHODS PERFORMED THEREIN

TECHNICAL FIELD

Embodiments herein relate to a first radio network node, a second radio network node, wireless device and methods performed therein for communication. Furthermore, a computer program product and a computer readable storage medium are also provided herein. In particular, embodiments herein relate to handling communication in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cells, with each service area or cell being served by a radio network node such as a radio access node e.g., a Wi-Fi access point or a radio base station (RBS), which in some networks may also be denoted, for example, a "NodeB", a "gNodeB", or a "eNodeB". A service area or cell is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for wireless devices. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3$^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted as the X2 interface. EPS is the Evolved 3GPP Packet Switched Domain.

Network sharing is supported in 3GPP based technologies e.g. by means of transmitting multiple network identities such as Public Land Mobile Network (PLMN) identities (ID) in the system information (SI) of a cell. Even though this works for most cases there are some use-cases where this type of network sharing is not good enough. For example, public safety applications, e.g. for police, firefighters, military, etc., do not accept that in some rare situations they may not be able to access the network. Intelligent transportation systems (ITS) also provide some services that must always be guaranteed absolute priority over all other traffic. For example, a data packet related to a vehicle breaking command from a car can never be allowed to be delayed due to a data packet from the entertainment system of the car. Typically, such "verticals" where absolute priority in all situations is a non-negotiable requirement for e.g. public safety, ITS, critical machine type communication (C-MTC), end up deploying their own network on their own dedicated spectrum.

5G-New radio (NR) is a new radio access technology currently being standardized in 3GPP, NR for short. One characteristic of 5G NR is the "ultra-lean design principle". In 5G-NR the amount of mandatory broadcast signals that must always be transmitted is significantly reduced compared to LTE.

5G-NR is furthermore designed to better support high gain and dynamic beamforming and it will also support operation in higher frequency band compared to LTE, such as millimeter wave (mmW). For these high frequency bands it is not possible or cost efficient with current technology to perform digital beam-forming and hence 5G-NR will support analog beamforming as well. In order to transmit system information and basic system synchronization with analog beamforming a common solution is to perform beam-sweeping, see FIG. 1, wherein each beam is transmitted consecutively in time. When analog beam-sweeping is used for system information it is typically not possible to use the bandwidth for any other purpose.

Absolute priority in 3GPP systems can only be guaranteed after "initial access". Once wireless devices are connected to the wireless communication network, the scheduler in each cell can prioritize the traffic of certain users or services over other traffic. But if there is congestion on the random access channel (RACH) this is not possible and thus even high priority traffic may be blocked from accessing the wireless communication network at times of high load. For public safety use-cases this is not acceptable, e.g. if there is an explosion in a stadium full of people, the public safety personnel must be guaranteed access to the wireless communication network.

Access barring mechanisms that are used to mitigate these problems are too slow and do not provide an absolute priority guarantee for e.g. public safety users. Today the only way to guarantee absolute priority in all situations is to deploy separate communication networks using a dedicated spectrum. This is expensive and it results in inefficient use of spectrum of the wireless communication network.

SUMMARY

An object of embodiments herein is to provide a mechanism for using the wireless communication network in an efficient manner.

According to an aspect the object is achieved by providing a method performed by a first radio network node for handling communication of a wireless device in a wireless communication network comprising at least a first cell and a second cell configured over at least partly a same bandwidth. The first radio network node transmits a first system information (SI) over the first cell, wherein the first SI comprises one or more network identities (ID), and one or more access configurations for the one or more network IDs. The one or more network IDs are associated to a service that is prioritized over other services.

According to another aspect the object is achieved by providing a method performed by a second radio network node for handling communication of a wireless device in a wireless communication network comprising at least a first cell and a second cell configured over at least partly a same bandwidth. The second radio network node transmits a second SI over the second cell, wherein the second SI comprises one or more network IDs and one or more access configurations for the one or more network IDs. The one or more network IDs are associated to one or more services other than a service that is prioritized and the one or more access configurations are non-overlapping one or more access configurations of the service that is prioritized. The second radio network node may e.g. schedule resources of the second cell based on scheduled resources associated to the service that is prioritized in the first cell. For example, the second radio network node may receive a resource indication from the first radio network node wherein the resource indication indicates the scheduled resources associated to the service that is prioritized and, based on the resource indication, may schedule resources of the second cell.

According to a further aspect the object is achieved by providing a method performed by a wireless device for handling communication in a wireless communication network comprising at least a first cell and a second cell configured over at least partly a same bandwidth. The wireless device is associated with one or more associated network IDs. The wireless device receives, from a first radio network node, a first SI. The first SI comprises one or more network IDs and one or more access configurations for the one or more network IDs, and the one or more network IDs are associated to a service that is prioritized over other services. The wireless device further, when the associated one or more network IDs match the one or more network IDs in the first SI, use the one or more access configurations when initiating access to access the first radio network node for the service that is prioritized over other services.

According to yet another aspect the object is achieved by providing a first radio network node for handling communication of a wireless device in a wireless communication network comprising at least a first cell and a second cell configured over at least partly a same bandwidth. The first radio network node is configured to transmit a first SI over the first cell. The first SI comprises one or more network IDs and one or more access configurations for the one or more network IDs. The one or more network IDs are associated to a service that is prioritized over other services.

According to still another aspect the object is achieved by providing a second radio network node for handling communication of a wireless device in a wireless communication network comprising at least a first cell and a second cell configured over at least partly a same bandwidth. The second radio network node is configured to transmit a second SI over the second cell. The second SI comprises one or more network IDs and one or more access configurations for the one or more network IDs. The one or more network IDs are associated to one or more services other than a service that is prioritized and the one or more access configurations are non-overlapping one or more access configurations of the service that is prioritized.

According to still yet another aspect the object is achieved by providing a wireless device for handling communication in a wireless communication network comprising at least a first cell and a second cell configured over at least partly a same bandwidth. The wireless device is configured to receive from a first radio network node, a first SI. The first SI comprises one or more network IDs and one or more access configurations for the one or more network IDs. The one or more network IDs are associated to a service that is prioritized over other services. The wireless device is associated with one or more associated network IDs. When the associated one or more network IDs match the one or more network IDs in the first SI, the wireless device is also configured to use the one or more access configurations when initiating access to access the first radio network node for the service that is prioritized over other services.

According to a further aspect the object is achieved by providing first radio network node comprising processing circuitry configured to transmit a first SI over a first cell of a wireless communication network comprising at least the first cell and a second cell configured over at least partly a same bandwidth. The first SI comprises one or more network IDs and one or more access configurations for the one or more network IDs. The one or more network IDs are associated to a service that is prioritized over other services.

According to a further aspect the object is achieved by providing a second radio network node comprising processing circuitry configured to transmit a second SI over a second cell of a wireless communication network comprising at least a first cell and the second cell configured over at least partly a same bandwidth. The second SI comprises one or more network IDs and one or more access configurations for the one or more network IDs. The one or more network IDs are associated to one or more services other than a service that is prioritized and the one or more access configurations are non-overlapping one or more access configurations of the service that is prioritized.

According to a further aspect the object is achieved by providing a wireless device comprising processing circuitry configured to receive, from a first radio network node of a wireless communication network comprising at least a first cell and a second cell configured over at least partly a same bandwidth, a first SI. The first SI comprises one or more network IDs and one or more access configurations for the one or more network IDs. The one or more network IDs are associated to a service that is prioritized over other services. The wireless device is associated with one or more associated network IDs. When the associated one or more network IDs match the one or more network IDs in the first SI, the processing circuitry is also configured to use the one or more access configurations when initiating access to access the first radio network node for the service that is prioritized over other services.

It is furthermore provided herein a computer program product comprising instructions, which, when executed on at least one processor, cause the at least one processor to carry out any of the methods above, as performed by the wireless device, the first radio network node or the second radio network node. It is additionally provided herein a computer-readable storage medium, having stored thereon a computer program product comprising instructions which, when executed on at least one processor, cause the at least one processor to carry out the method according to any of the methods above, as performed by the wireless device, the first radio network node or the second radio network node.

Embodiments herein enable a network to use services that are prioritized over other services for wireless devices of certain network IDs. This avoids the cost and spectrum waste of implementing parallel networks with requirements on absolute priority. Embodiments herein may utilize the ultra-lean design of the 5G standard and in some embodiments the spectrum wastage associated with analog beamforming is reduced since two SI may be transmitted, one associated with e.g. a first list of network IDs and one associated with e.g. a second list of network IDs. Thus, embodiments herein introduce handling services of priority guaranteed in an efficient and reliable manner. This leads to an improved performance of the wireless communication network.

BRIEF DESCRIPTION OF THE DRAWINGS

Embodiments will now be described in more detail in relation to the enclosed drawings, in which:

FIGS. 14-17 are flowcharts illustrating methods implemented in a communication system including a host computer, a base station and a user equipment.

DETAILED DESCRIPTION

Figure 1:
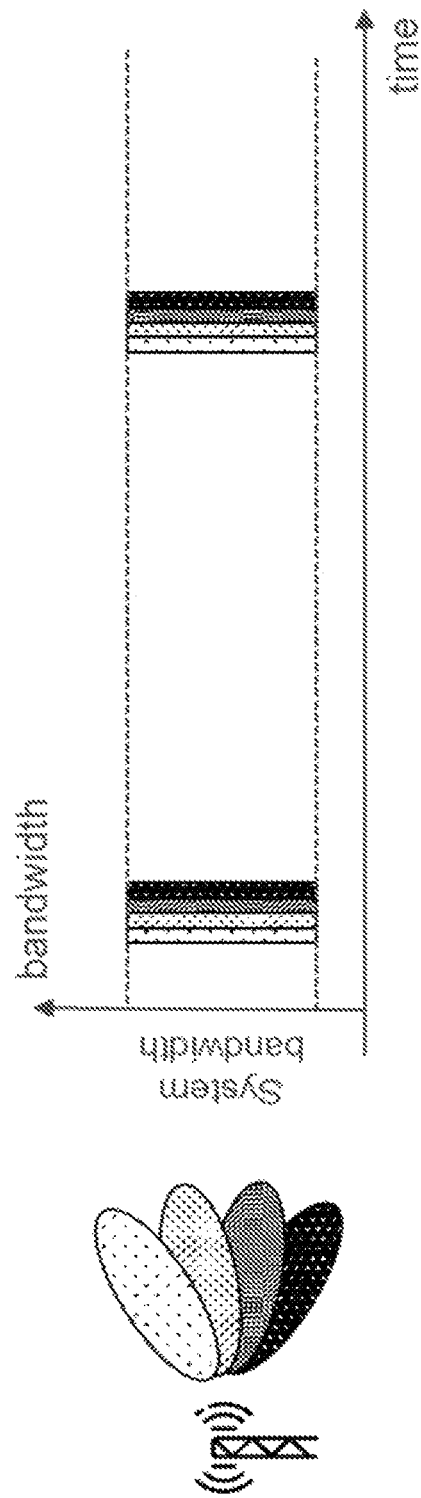
FIG. 1 is a schematic overview depicting a beamforming process.
Figure 2:
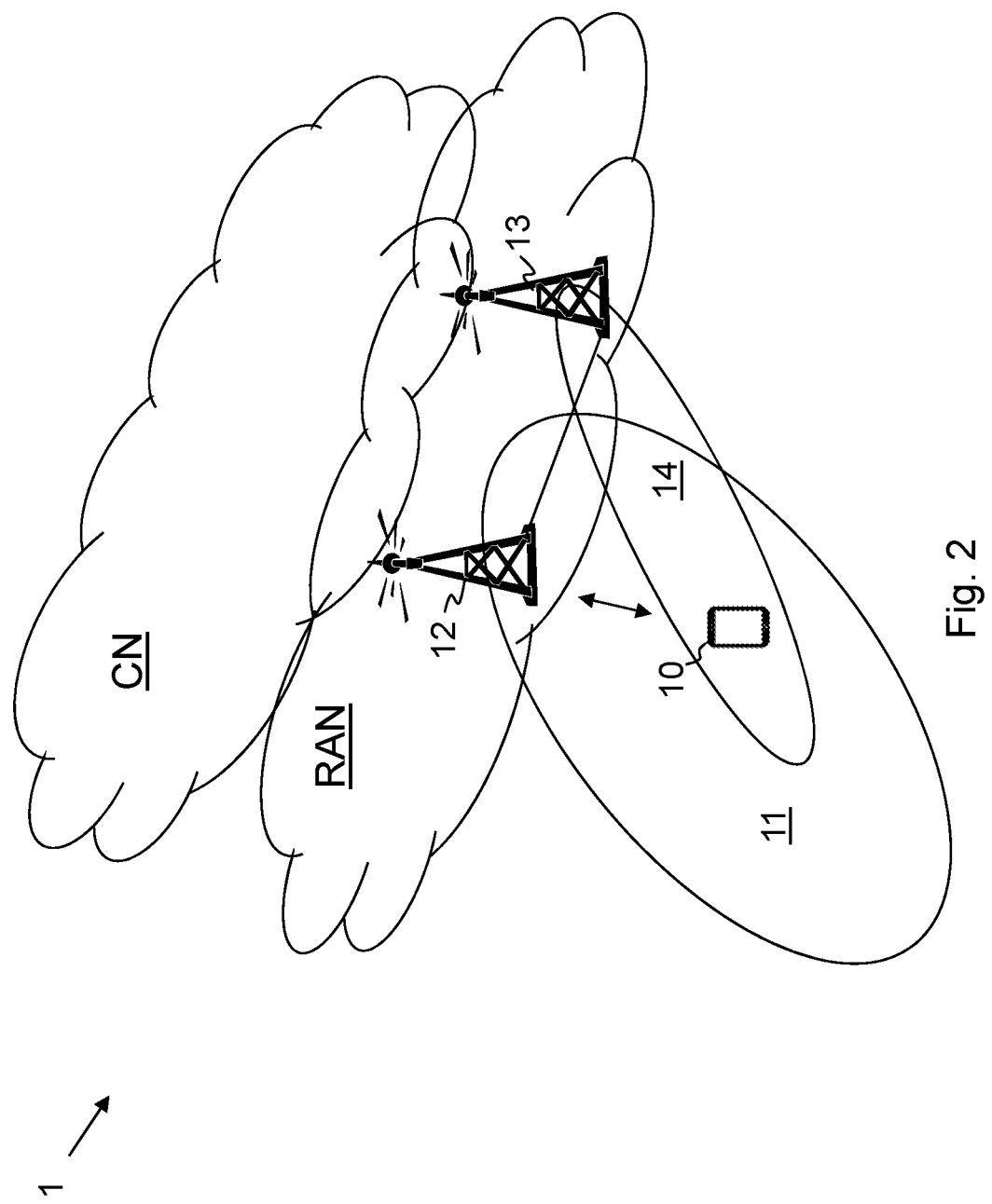
FIG. 2 is a schematic overview depicting a wireless communication network according to embodiments herein.

Embodiments herein relate to wireless communication networks in general. FIG. 2 is a schematic overview depicting a wireless communication network 1. The wireless communication network 1 comprises one or more RANs e.g. a first RAN (RAN1), connected to one or more CNs. The wireless communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the wireless communication network 1, wireless devices e.g. a wireless device such as a mobile station, a non-access point (non-AP) STA, a STA, a user equipment and/or a wireless terminal, are connected via the one or more RANs, to the one or more CNs. It should be understood by those skilled in the art that "wireless device" is a non-limiting term which means any terminal, wireless communication terminal, communication equipment, Machine Type Communication (MTC) device, Device to Device (D2D) terminal, or user equipment e.g. smart phone, laptop, mobile phone, sensor, relay, mobile tablets or any device communicating within a cell or service area.

The wireless communication network 1 comprises a first radio network node 12. The first radio network node 12 is exemplified herein as a RAN node providing radio coverage over a geographical area, a first cell or service area 11, of a radio access technology (RAT), such as NR, LTE, UMTS, Wi-Fi or similar. The first radio network node 12 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a gNodeB, a base transceiver station, Access Point Base Station, base station router, a transmission arrangement of a radio base station, a stand-alone access point or any other network unit capable of serving a wireless device within the cell served by the first radio network node 12 depending e.g. on the radio access technology and terminology used and may be denoted as a receiving radio network node. The first radio network node 12 may alternatively be a core network node such as an MME e.g. in the case where the communication is performed from the RAN to the CN.

It should be noted that a service area may be denoted as 'cell', beam, beam group or similar to define an area of radio coverage.

Furthermore, the wireless communication network 1 comprises a second radio network node 13. The second radio network node 13 is exemplified herein as a RAN node providing radio coverage over a geographical area, a second cell or service area 14, of a RAT, such as NR, LTE, UMTS, Wi-Fi or similar. The second radio network node 13 is exemplified herein as a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a gNodeB, a base transceiver station, Access Point Base Station, base station router, a transmission arrangement of a radio base station, a stand-alone access point or any other network unit capable of using an association with the first radio network node 12 depending e.g. on the radio access technology and terminology used. However, the second radio network node 13 may alternatively be a core network node in the core network such as an MME or another network node. The radio network nodes 12, 13 may be interconnected with each other by means of one or more X2 interfaces, S1 interfaces or XW interfaces. In the illustrated examples herein the first radio network node 12 is an access point and the second radio network node 13 is another access point, however, as stated above may the first radio network node 12 be a core network node and the second radio network node may be an access point 13 or vice versa. The first and second radio network node may be a combined node comprising the first radio network node 12 and the second radio network node 13 or the first radio network node 12 may serve or control one or more cells e.g. both the cells such as both the first cell 11 and second cell 14.

Embodiments herein disclose a method to enable in a network absolute priority for wireless devices belonging or associated with a first PLMN ID over wireless devices belonging or associated with another, a second, PLMN ID. The wireless communication network 1 may comprise overlapping cells or overlapping bandwidths. The wireless communication network 1 thus comprises at least two cells transmitting over at least a part of a same bandwidth in which the first cell and the second cell transmit or broadcast independent system information (SI), a first SI and a second SI. Each SI comprises one or more network identities, e.g. a PLMN ID list, and an access configuration e.g. a random access channel (RACH) configuration such as a physical random access channel (PRACH) configuration characterized that the PLMN ID list and PRACH configuration in the first SI of the first cell 11 are different than the PLMN ID list and PRACH configuration in the second SI of the second cell 14. The access configuration may define resources to use when accessing the respective radio network node such a preamble and/or time and frequency resources. The system information of the at least first and second cell may define a first and a second physical downlink control channel wherein said first and second physical downlink control channels (PDCCH) are identical. Each of said first cell 11 and second cell 14 may comprise a scheduler where the scheduler for the first cell 11 may utilize all assignable resources while the scheduler for the second cell 14 may utilize only remaining assignable resources after wireless devices in the first cell 11 have been scheduled. The scheduler for the second cell 14 is not allowed to schedule any transmissions overlapping with PRACH or scheduling request channels used in the first cell 11. It should be noted that the first radio network node 12 may comprise both schedulers and may control both the first and the second service areas or cells. Same scheduler software may manage both the at least first and second cell. The decision of the scheduler for the second cell 14 may always be taken after a decision for the first cell 11. The second cell 14 may be a cell that serves multiple PLMNs.

In some embodiments the second radio network node 13 may receive scheduling decisions from a network node such as the first radio network node 12 that overrides or take precedence over any scheduling decisions performed in the second radio base station 13 for the second cell 14.

The wireless device 10 may be capable of attaching to both the first and the second cell 14 and may be configured to always select the cell having absolute priority. The first and second radio network nodes may be configured to send simultaneous SS blocks for the first and second cells, or to send non-simultaneous SS blocks for the first and second cells. Service area will now be referred to as cells below.

Figure 3A:
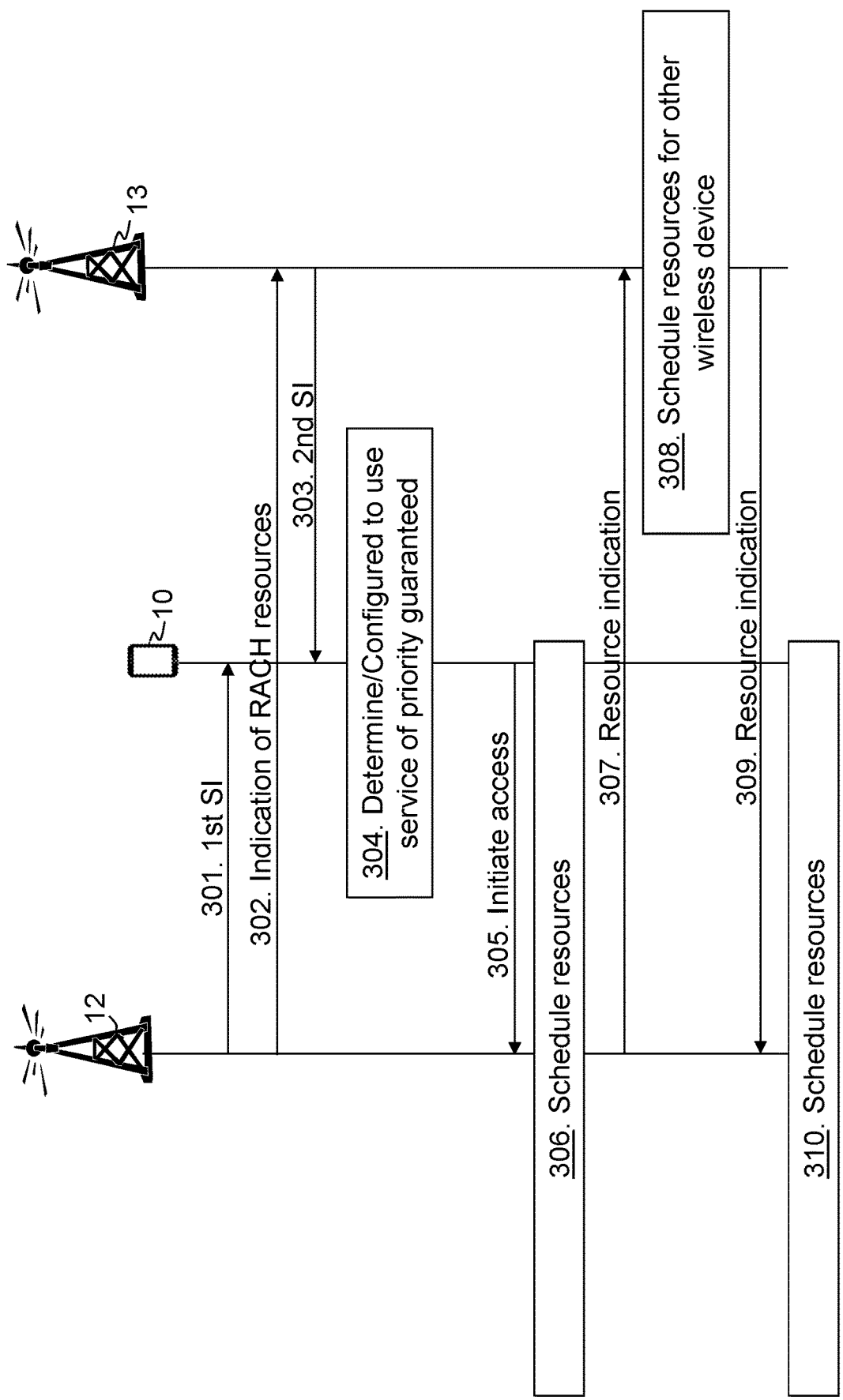
FIG. 3a is a combined flowchart and signalling scheme according to embodiments herein.

FIG. 3*a* is a combined flowchart and signalling scheme according to some embodiments herein. The first cell 11 and the second cell 14 are configured over at least partly a same bandwidth.

Action 301. The first radio network node 12 transmits the first SI of the first cell 11, wherein the first SI comprises e.g. a first PLMN ID and a first RACH configuration for the first PLMN ID associated with a prioritized service.

Action 302. The first radio network node 12 may transmit to the second radio network node 13, an indication indicating the first RACH configuration for the first PLMN ID associated with the prioritized service.

Action 303. The second radio network node 13 transmits second SI of the second cell 14, wherein the second SI comprises a second PLMN ID and a second RACH configuration for the second PLMN ID. The first PLMN ID and the first RACH configuration being different than the second PLMN ID and the second RACH configuration, i.e. the one or more access configurations are non-overlapping one or more access configurations of the service that is prioritized.

Action 304. The wireless device 10, being configured to use the first cell 11 and/or the second cell 14 for communication, receives the SI of the respective cell. Furthermore, the wireless device 10 may determine to use the service of priority guaranteed or always be configured to use the service of priority guaranteed e.g. being associated with, such as registered to, the first PLMN ID.

Action 305. The wireless device 10 may then perform or initiate an access process using the first RACH configuration of the first PLMN ID in order to connect to the first cell 11 for the service prioritized over other services. It should be understood that the wireless device 10 may connect to the second cell 14 for a service of a lower priority.

Action 306. The first radio network node 12 may schedule resources for the wireless device 10 for the service prioritized over other services.

Action 307. The first radio network node 12 may transmit a resource indication indicating the scheduled resources to the second radio network node 13.

Action 308. The second radio network node 13 may thus receive the resource indication and based on the resource indication perform a scheduling decision for another wireless device in the second cell 14 to avoid resources already scheduled at the first radio network node 12.

Action 309. The second radio network node 13 may transmit to the first radio network node 12, a similar resource indication indicating the scheduled resources at the second radio network node 13.

Action 310. The first radio network node 12 may receive the similar resource indication and based on the similar resource indication performs another scheduling decision for the wireless device 10 or another wireless device in the first cell 11.

Figure 3B:
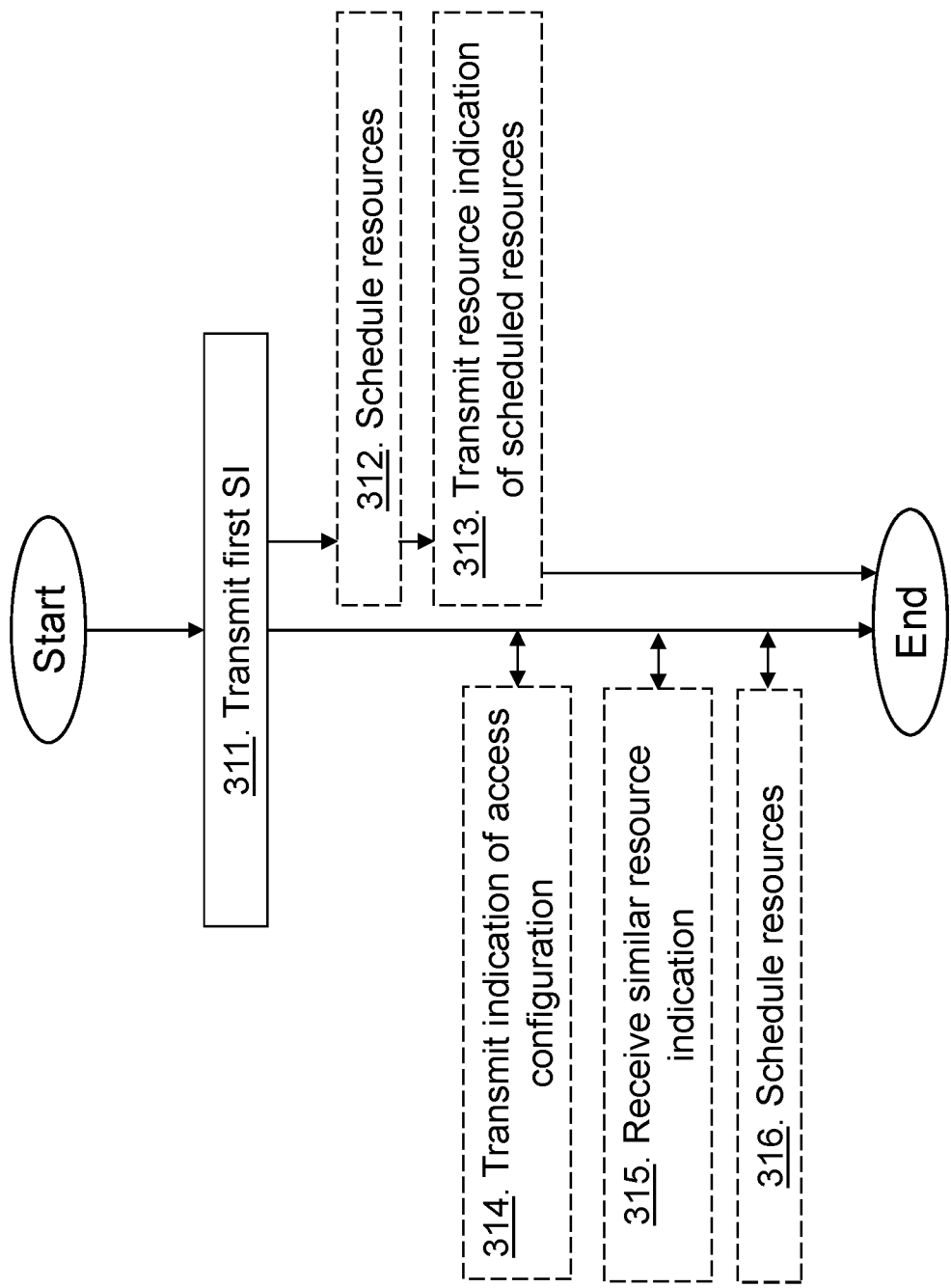
FIG. 3b is a schematic flowchart depicting a method performed by a first radio network node according to embodiments herein.

The method actions performed by the first radio network node 12 for handling communication of the wireless device 10 in the wireless communication network 1 comprising at least the first cell and the second cell configured over at least partly a same bandwidth according to embodiments will now be described with reference to a flowchart depicted in FIG. 3*b*. The actions do not have to be taken in the order stated below, but may be taken in any suitable order. Actions performed in some embodiments are marked with dashed boxes.

Action 311. The first radio network node 12 transmits the first SI over the first cell 11. The first SI comprises one or more network IDs and one or more access configurations for the one or more network IDs. The one or more network IDs are associated to the service that is prioritized over other services. The one or more network IDs may be PLMN IDs and/or the one or more access configurations may be one or more PRACH configurations for the PLMN IDs.

Action 312. The first radio network node 12 may then schedule resources associated to the service that is prioritized, e.g. time/frequency resources. For example, the first radio network node 12 may receive from the wireless device 10 an access request using the one or more access configurations, e.g. a preamble, for the one or more network IDs.

Action 313. The first radio network node 12 may further transmit a resource indication to the second radio network node 13, wherein the resource indication indicates the scheduled resources associated to the service that is prioritized.

Action 314. The first radio network node 12 may transmit to the second radio network node 13 indication indicating the access configuration for the one or more network IDs associated with the prioritized service.

Action 315. The first radio network node 12 may receive from the second radio network node 13 a similar resource indication indicating the scheduled resources at the second radio network node 13.

Action 316. The first radio network node 12 may, based on the similar resource indication, perform another scheduling decision or schedule resources for the wireless device 10 in the first cell 11.

Figure 3C:
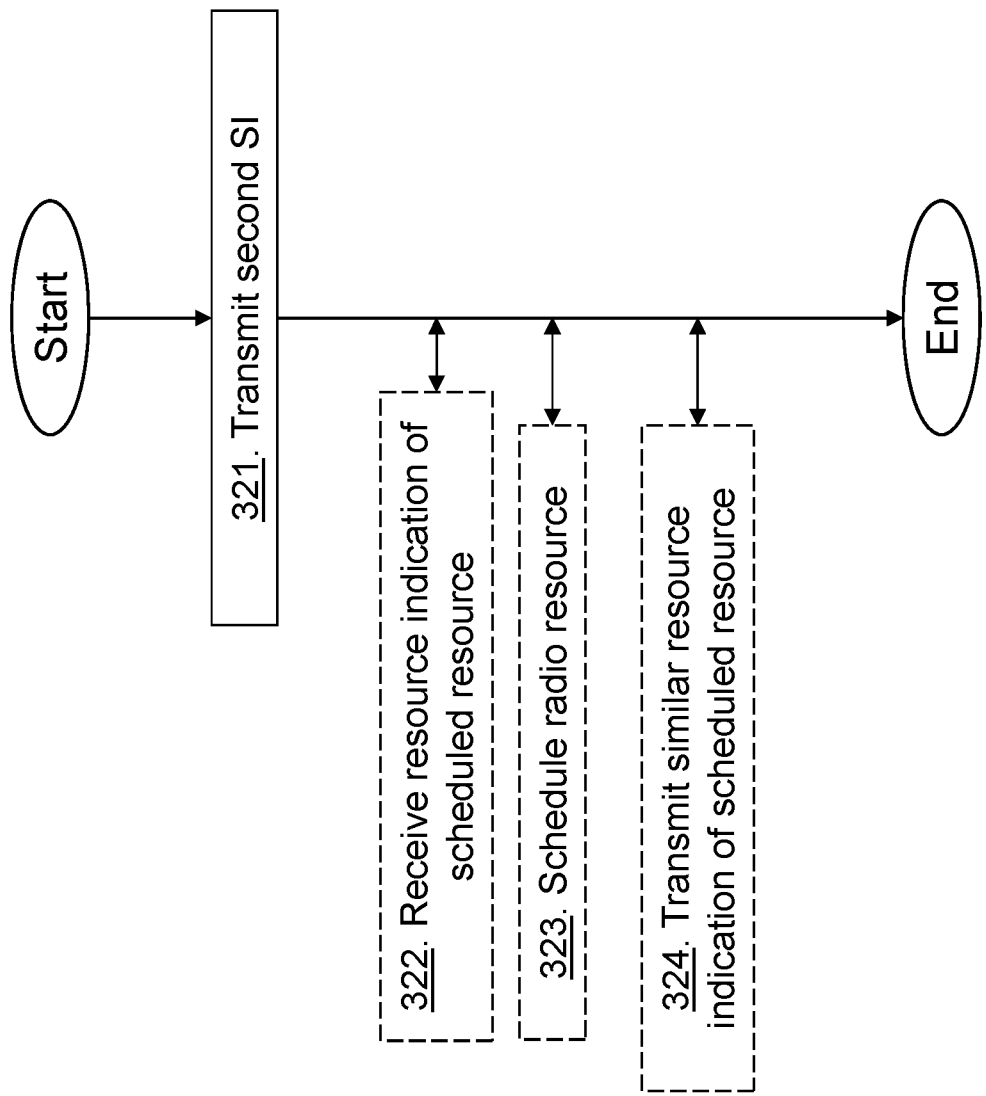
FIG. 3c is a schematic flowchart depicting a method performed by a second radio network node according to embodiments herein.

The method actions performed by the second radio network node 13 for handling communication of the wireless device 10 in the wireless communication network 1 comprising at least the first cell and the second cell configured over at least partly a same bandwidth according to embodiments will now be described with reference to a flowchart depicted in FIG. 3c. The actions do not have to be taken in the order stated below, but may be taken in any suitable order. Actions performed in some embodiments are marked with dashed boxes.

Action 321. The second radio network node 13 transmits the second SI over the second cell 14, wherein the second SI comprises one or more network IDs and one or more access configurations for the one or more network IDs. The one or more network IDs are associated to one or more services other than the service that is prioritized and the one or more access configurations are non-overlapping one or more access configurations of the service that is prioritized. The one or more network IDs may be PLMN IDs and/or the one or more access configurations may be one or more PRACH configurations for the one or more PLMN IDs.

Action 322. The second radio network node 13 may receive the resource indication from the first radio network node 12, wherein the resource indication indicates scheduled resources, in the first cell 11, associated to the service that is prioritized.

Action 323. The second radio network node 13 may schedule resources of the second cell 14 based on scheduled resources associated to the service that is prioritized in a first cell 11. E.g. based on the received resource indication the second radio network node 13 may schedule resources of the second cell 14. The first and second cell may comprise a same control channel configuration.

Figure 3D:
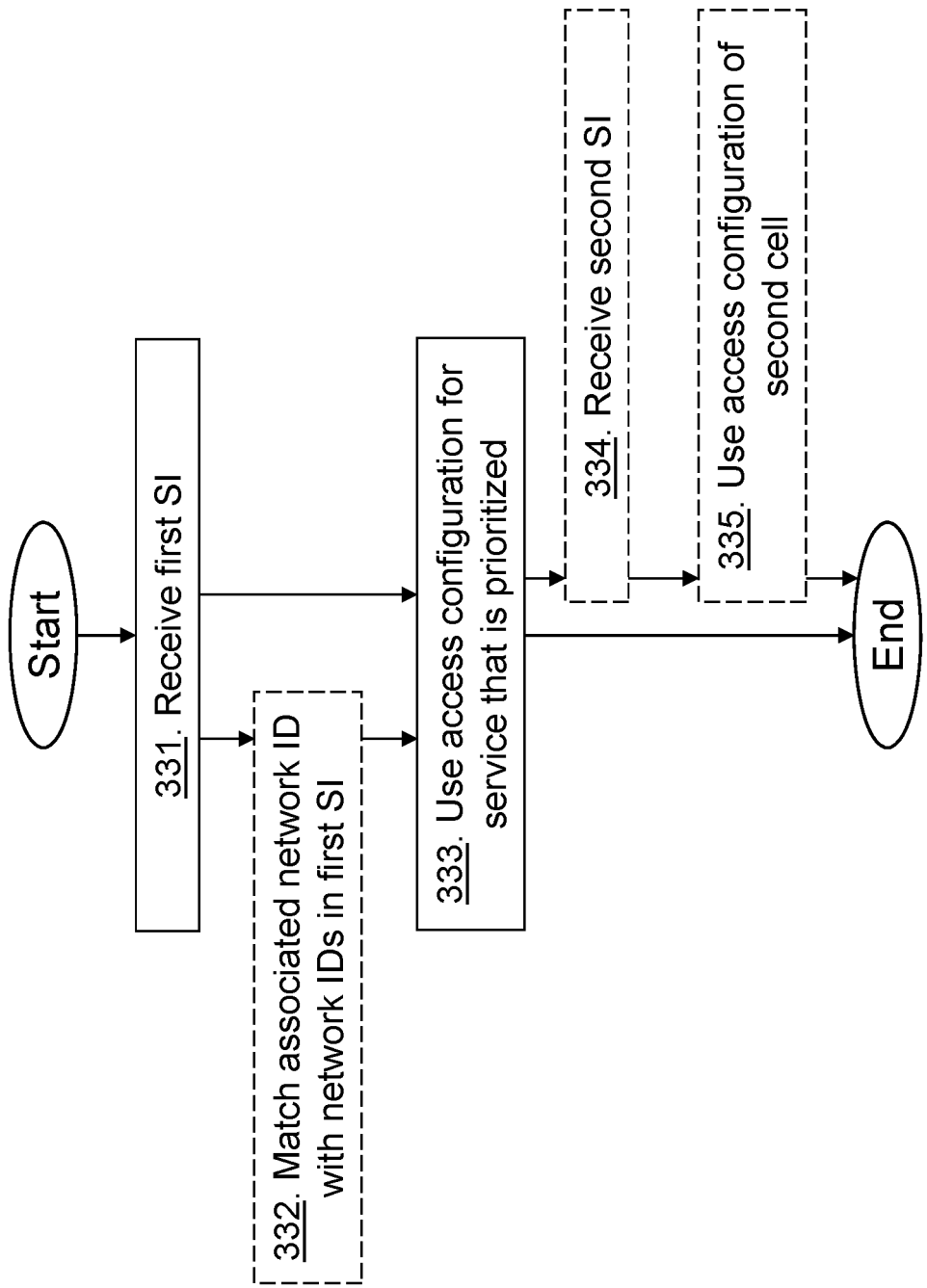
FIG. 3d is a schematic flowchart depicting a method performed by a wireless device according to embodiments herein.

The method actions performed by the wireless device 10 for handling communication in the wireless communication network 1 comprising at least the first cell and the second cell configured over at least partly a same bandwidth according to embodiments will now be described with reference to a flowchart depicted in FIG. 3d. The actions do not have to be taken in the order stated below, but may be taken in any suitable order. Actions performed in some embodiments are marked with dashed boxes. The wireless device 10 is associated with one or more associated network ID. E.g. the wireless device 10 may be configured with network IDs for services prioritized over other services e.g. an emergency service or similar.

Action 331. The wireless device 10 receives, from the first radio network node 12, the first SI, wherein the first SI comprises one or more network IDs and one or more access configurations for the one or more network IDs. The one or more network IDs are associated to the service that is prioritized over other services.

Action 332. The wireless device 10 may match the one or more network IDs in the first SI with the associated one or more network IDs.

Action 333. The wireless device 10, when the associated one or more network IDs match the one or more network IDs in the first SI, uses the one or more access configurations when initiating access to access the first radio network node for the service that is prioritized over other services. The wireless device 10 may, upon a successful match of the network IDs, determine to use the one or more access configurations when initiating access to access the first radio network node for the service that is prioritized over other services. The one or more network IDs may be PLMN IDs and/or the one or more access configurations may be one or more PRACH configurations for the PLMN IDs.

Action 334. The wireless device 10 may receive the second SI e.g. over the second cell 14, wherein the second SI comprises the one or more network ID and the one or more access configurations for the one or more network IDs of the second cell 14. The one or more network IDs are associated to one or more services other than the service that is prioritized and the one or more access configurations are non-overlapping one or more access configurations of the service that is prioritized.

Action 335. The wireless device 10 may then use the one or more access configurations of the second SI when initiating access to access the second radio network node 13 for one or more services other than the service that is prioritized.

Since 5G-New Radio (NR) is ultra-lean, the cost in terms of radio resources to transmit two cells in a same radio spectrum is limited. In 5G-NR the system information (SI) that is broadcast comprises at least one instance of a Synchronization Signal (SS) Block and an NR-PDCCH/NR-physical downlink shared channel (PDSCH) transmission providing NR-system information block 1 (SIB1) required for initial access and cell camping, and paging messages. The SS Block consists of 4 orthogonal frequency-division multiplexing (OFDM) symbols containing the NR-primary synchronization signal (PSS), NR-secondary synchronization signal (SSS), and NR-physical broadcast channel (PBCH), which contains the NR-master information block (MIB). In some deployments where there is enough bandwidth available the transmissions of NR-SIB1 and paging messages can be frequency multiplexed together with the SS Block.

The ultra-lean design of 5G-NR enables multiple cells to be transmitted in the same spectrum. For example, one configuration may be as follows: the first cell 11 is configured for prioritized PLMN IDs and the second cell 14 is configured for other PLMN IDs.

Figure 4:
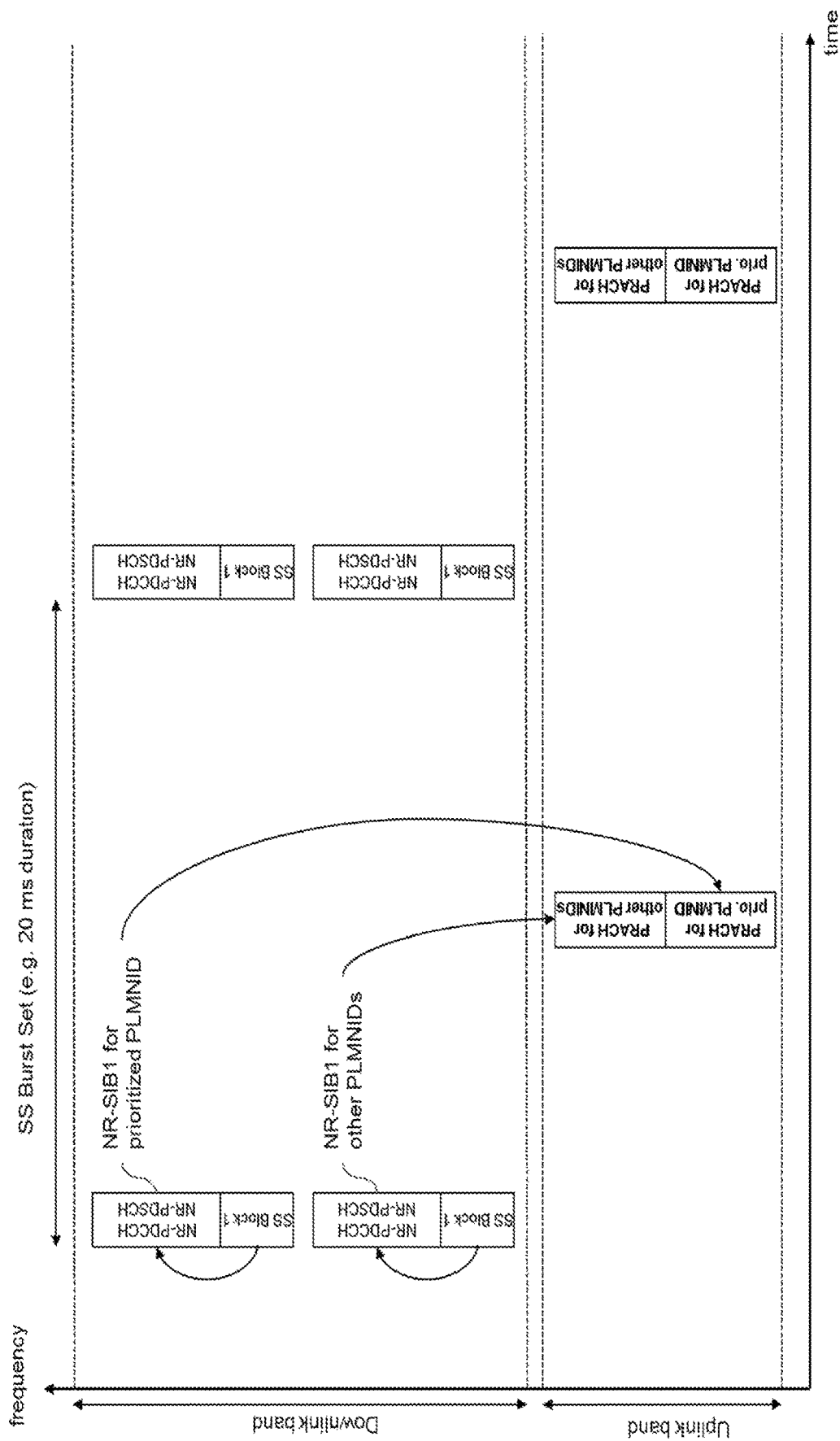
FIG. 4 shows an embodiment in a FDD (frequency division duplex) scenario.

If both service areas, the first cell 11 and the second cell 14, transmit their own version of the system information in NR-SIB1 then they can define different physical random access channel (PRACH) resources, see FIG. 4.

FIG. 4 shows an example embodiment in a frequency division duplex (FDD) scenario in which the first cell 11 and the second cell 14 are defined in the same bandwidth, each has their own system information, e.g. NR-SIB1, which is configured a separate PRACH resource. Thus, according to some embodiments separate PRACH are defined for the first cell 11 and the second cell 14, such that the PRACH of the second cell 14 may never interfere with PRACH from the first cell 11. I.e. there is a separate NR-SIB1 for prioritized PLMN ID pointing to PRACH for prioritized PLMN ID and a NR-SIB1 for other PLMN IDs pointing to PRACH for other PLMN IDs in a SS burst set.

Figure 5:
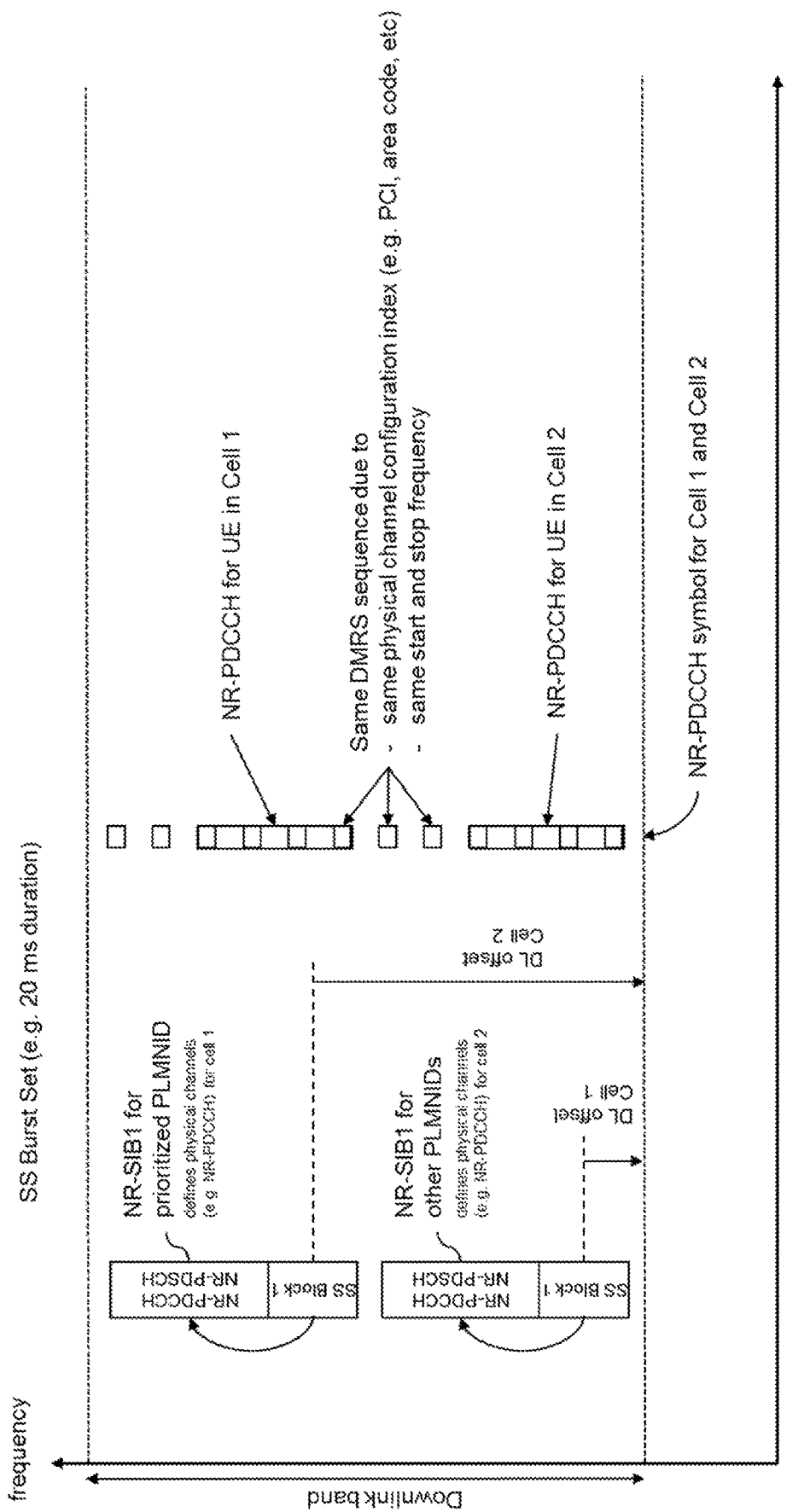
FIG. 5 shows an embodiment where both cells define fully overlapping indistinguishable NR-PDCCH channels.

In addition to define separate PRACH resources, and possibly also other dedicated uplink channels such as scheduling request (SR) channels, that are non-overlapping, the first cell 11 and the second cell 14 may define an identical NR-PDCCH channel, as depicted in FIG. 5 having a same control channel configuration e.g. a same NR-PDCCH symbol for the first cell and the second cell. The advantage with the identical control channel is that there is no "truncation loss" between the PDCCHs of the two cells. The cells share the same identical demodulation reference signals and resource elements. An alternative solution is to assign two different PDCCH channels with different demodulation reference signals and resource elements (e.g. different bandwidth). In that case, if one PDCCH becomes fully utilized and the other PDCCH is not, there is no quick way of transferring resources between the two PDCCH channels.

The way physical channels are expected to be defined in 5G-NR is that a physical channel configuration index is used to define a scrambling sequence for the demodulation reference signals (DMRS). Normally this physical channel configuration index is a physical cell identity (PCI) as defined by the primary and secondary synchronization signals, e.g. NR-PSS/NR-SSS, transmitted in the SS Block, and in that case the two cells could ensure that they will have identical DMRS sequences by simply selecting the same PCI, i.e. by selecting the same NR-PSS/NR-SSS sequences. With this configuration, there is no truncation loss between the two PDCCH channels associated with the two cells. Since they share the same DMRS and resource element one may seamlessly shift capacity between the two channels. This configuration creates to logically different channels that appear as if they were one and the same physical channel.

In order to ensure that the DMRS sequences are mapped in identical ways onto the actual resource elements the two cells need to define the start frequency index of the NR-PDCCH in a coordinated manner as schematically depicted in FIG. 4. Furthermore, the two cells must specify the same bandwidth for their NR-PDCCH channels. In this way, if the bandwidth of the NR-PDCCH used in the two cells completely overlap and both cells use the same index to derive the DMRS sequence then the channels become indistinguishable for the wireless devices. So, subsequent to, the separation of cells into, for example, different DL offsets for SS Blocks and the master information block (MIB), it is possible that the first cell 11 and the second cell 14 share the NR-PDCCH allocations. FIG. 5 shows an example embodiment wherein both cells define fully overlapping indistinguishable NR-PDCCH channels leading to no truncation loss.

Note that using the same PCI will not confuse the wireless devices into believing that the two cells are identical since they are defined using different center frequencies of the SS Block, defined by the DL offset. If, for some reason, selecting identical PCI for the two cells is not desirable, one option is to use any other index provided in the system information, such as an area code currently under discussion in 3GPP to be provided in the NR-MIB.

Having identical and indistinguishable NR-PDCCH configuration enables even more efficient sharing also of the control channel resources. An alternative is that both cells define their own NR-PDCCH channels that may be non-overlapping and in that case only the data channel of each cell (the NR-PDSCH for cell 11 and cell 14) can share resources.

Regarding UL resources, the NR-Physical Uplink Control Channel (PUCCH) is assumed to be configured to each wireless device after initial access and the system can ensure that wireless devices belonging to the first cell 11 are provided with dedicated NR-PUCCH resources not used by any wireless device belonging to the second cell 14. Assuming that the uplink data channels e.g. NR-Physical Uplink Shared Channels (PUSCH) are always scheduled, the network can assure that prioritized wireless devices in the first cell 11 are always prioritized.

Figure 6:
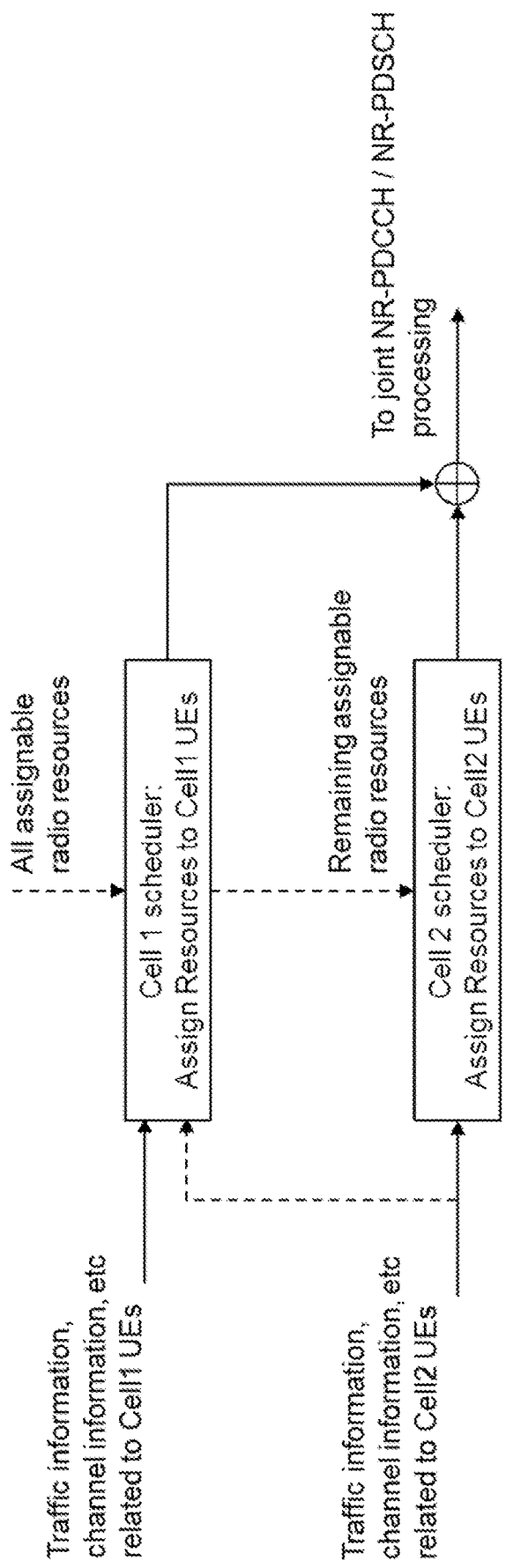
FIG. 6 shows resources that a scheduler can be configured to use, wherein the resources are not used by another scheduler.
Figure 7:
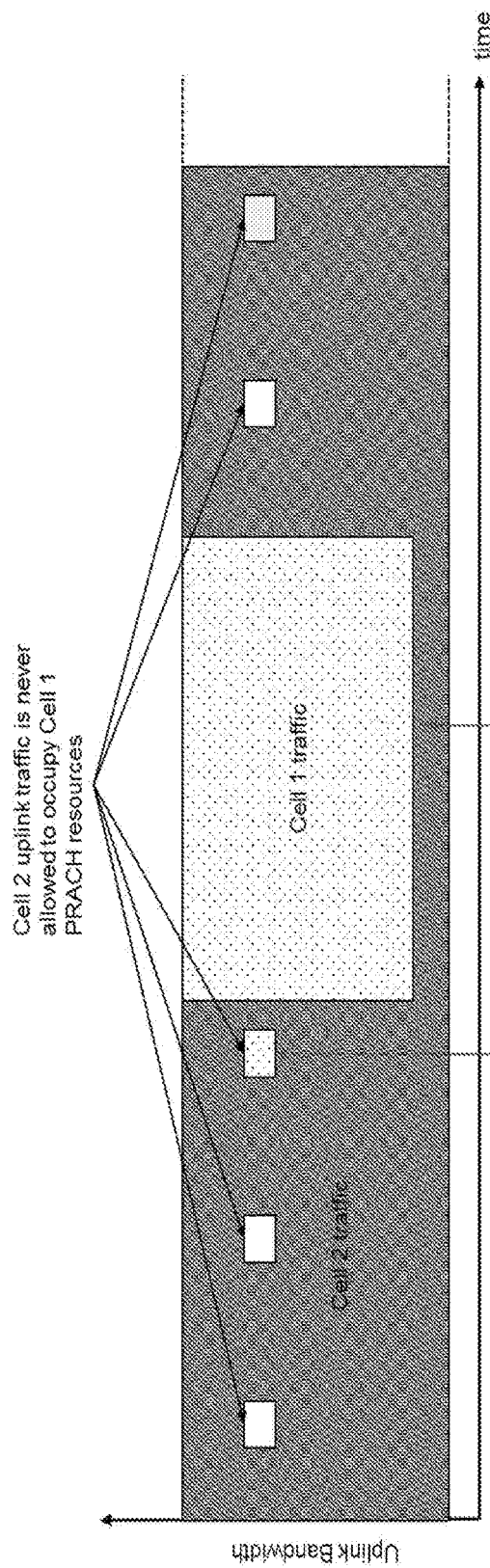
FIG. 7 shows resources that a scheduler can be restrained from ever using, wherein the resources are assigned to a different PRACH.
Figure 8:
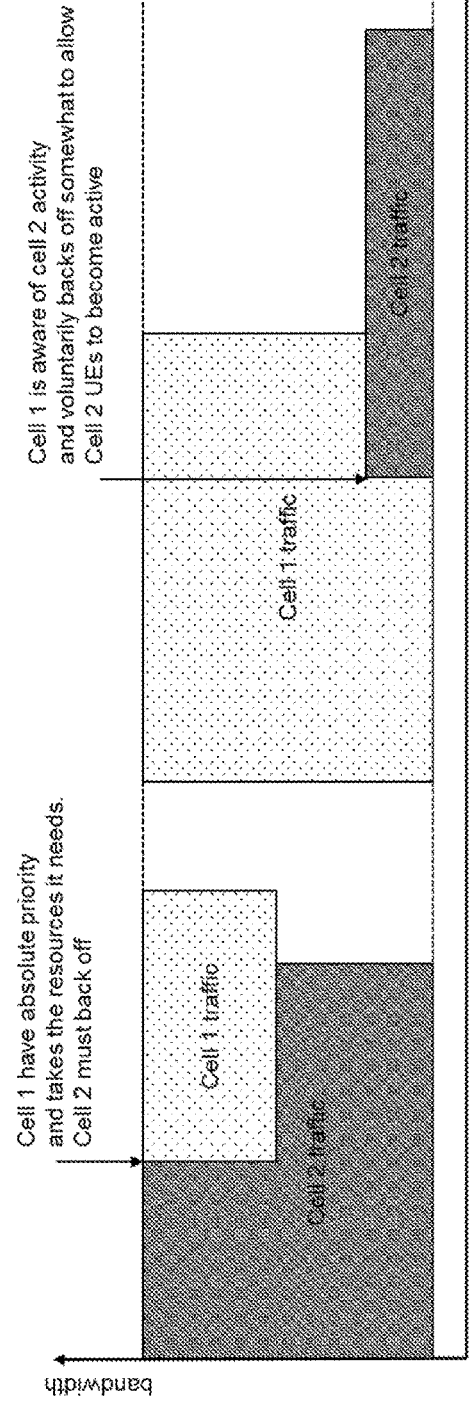
FIG. 8 depicts some aspects of embodiments herein.

One possible solution for handling of radio resources in the first cell 11 and the second cell 14 is depicted in FIG. 6 and further examples are provided in FIG. 7 and FIG. 8. Note that a radio network node such as the second radio network node 13 may e.g. implement only one of the cells, e.g. the second cell 14, and be given the scheduling decisions from another network node, e.g. scheduling of the first cell 11 may be implemented in a separate base band hotel.

In some embodiments the first cell 11 is implemented in separate and protected domain for public safety and the second cell 14 is only given a used resource without further information, see FIG. 7. In some embodiments an optional coordination feature is done so that joint scheduling may be performed. In some embodiments separate scheduling is done but the scheduler of the first cell 11 is informed about the impact of the impact of the scheduling decisions, see FIG. 8. For example, in an emergency cell, being an example of the second cell 14, scheduling can be of high priority, for example, due to positioning features implemented by the second cell 14.

FIG. 6 shows that the scheduler of the second cell 14, denoted as cell 2, can be configured to only use resources not used by the first cell 11, denoted as cell 1, scheduler. Traffic information, channel information etc. related to Cell 1 UEs are input to the first scheduler. Traffic information, channel information etc. related to Cell 2 UEs are input to the second scheduler. The first scheduler (Cell 1 scheduler) may receive an indication of all assignable radio resources and may assign resources to Cell 1 UEs based on the input. The first scheduler may provide an indication of remaining assignable radio resource to the second scheduler (Cell2 scheduler). Based on the input the second scheduler may assign resources to the UEs in cell 2. The information may be fed for joint NR-PDCCH/NR-PDSCH processing.

FIG. 7 shows that the scheduler of the second cell 14 can be restrained from ever using resources assigned to PRACH of the first cell 11. I.e. the second cell UL traffic is never allowed to occupy Cell 1 PRACH resources. It should be noted that the first cell 11, cell 1, may be restricted from totally starving the second cell, cell 2. It means that the second cell should have some resources to assign.

FIG. 8 shows an example where the scheduler of the first cell 11 takes into consideration the scheduling and/or traffic type of the second cell 14. The first cell 11 has absolute priority and takes the resources it needs and the second cell 14 must back off from resources scheduled by the first cell 11. However, the first cell 11 may be aware of activity in the second cell 14 and may voluntarily back off from some resources to allow wireless devices of the second cell 14 to become active.

Figure 9:
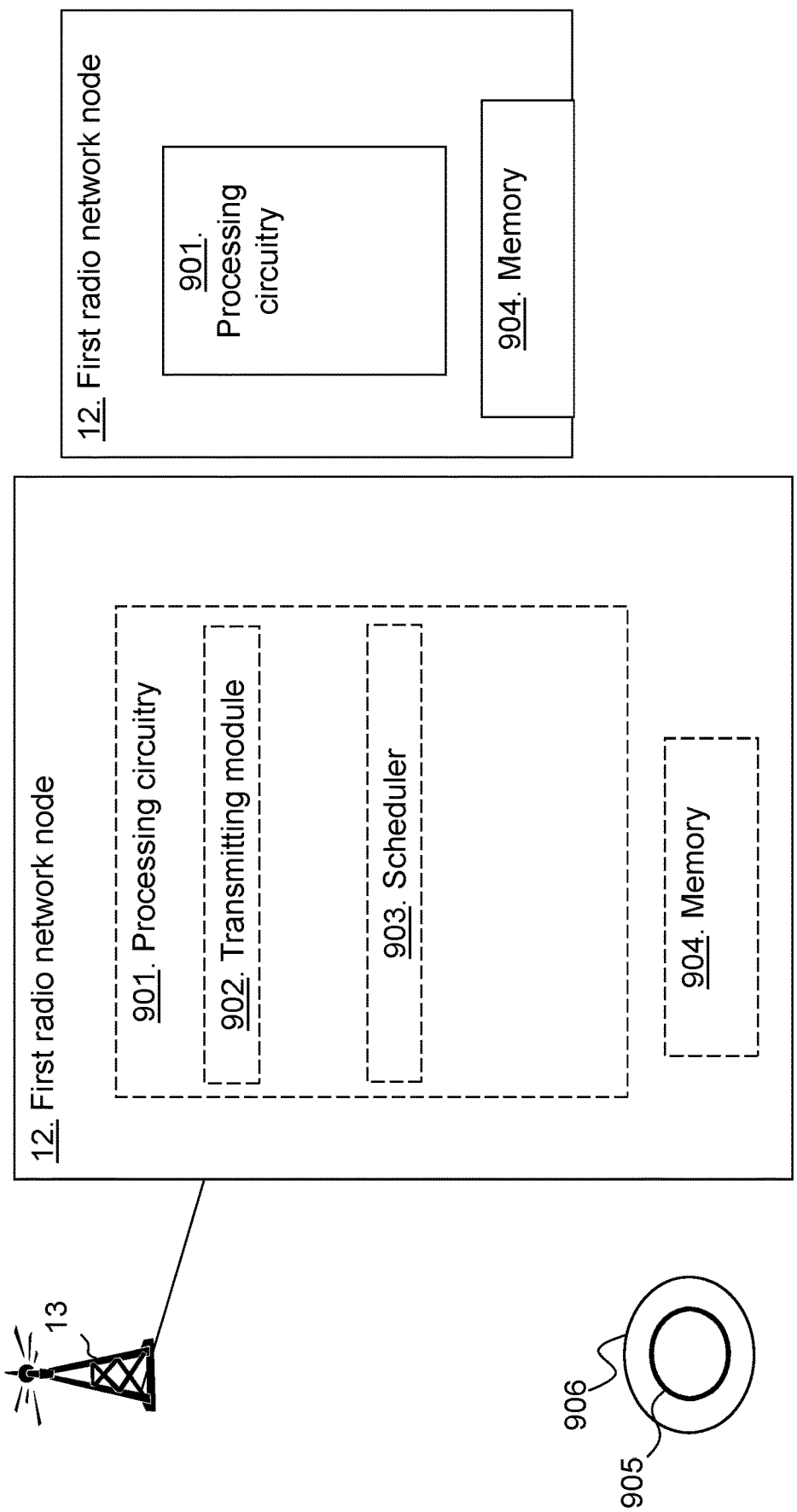
FIG. 9 is a block diagram depicting a first radio network node according to embodiments herein.

FIG. 9 is a block diagram depicting the first radio network node 12 for handling communication of the wireless device in the wireless communication network comprising at least the first cell and the second cell configured over at least partly the same bandwidth according to embodiments herein.

The receiving first radio network node 12 such as a radio base station or an MME may comprise processing circuitry 901, e.g. one or more processors, configured to perform the methods herein.

The first radio network node 12 may comprise a transmitting module 902, e.g. a transmitter or transceiver. The first radio network node 12, the processing circuitry 901 and/or the transmitting module 902 is configured to transmit the first SI over the first cell, wherein the first SI comprises one or more network ID, such as PLMN IDs, and one or more access configurations, such as PRACH configurations, for the one or more network IDs. The one or more network IDs are associated to a service that is prioritized over other services.

The first radio network node 12 may comprise a scheduler 903. The first radio network node 12, the processing circuitry 901 and/or the scheduler 903 may be configured to schedule resources associated to the service that is prioritized. The first radio network node 12, the processing circuitry 901 and/or the transmitting module 902 may be configured to transmit, to the second radio network node 13, the resource indication indicating the scheduled resources associated to the service that is prioritized.

The first radio network node 12 further comprises a memory 904. The memory comprises one or more units to be used to store data on, such as network IDs, resources, wireless device identities, radio network node identities, applications to perform the methods disclosed herein when being executed, and similar. Thus, the first radio network node 12 may comprise the processing circuitry and the memory, said memory comprising instructions executable by said processing circuitry whereby said radio network node is operative to perform the methods herein.

The methods according to the embodiments described herein for the first radio network node 12 are respectively implemented by means of e.g. a computer program 905 or a computer program product 905, comprising instructions, i.e., software code portions, which, when executed on at least one processor, cause the at least one processor to carry out the actions described herein, as performed by the first radio network node 12. The computer program product 905 may be stored on a computer-readable storage medium 906, e.g. a disc or similar. The computer-readable storage medium 906, having stored thereon the computer program, may comprise the instructions which, when executed on at least one processor, cause the at least one processor to carry out the actions described herein, as performed by the first radio network node 12. In some embodiments, the computer-readable storage medium may be a non-transitory computer-readable storage medium.

Figure 10:
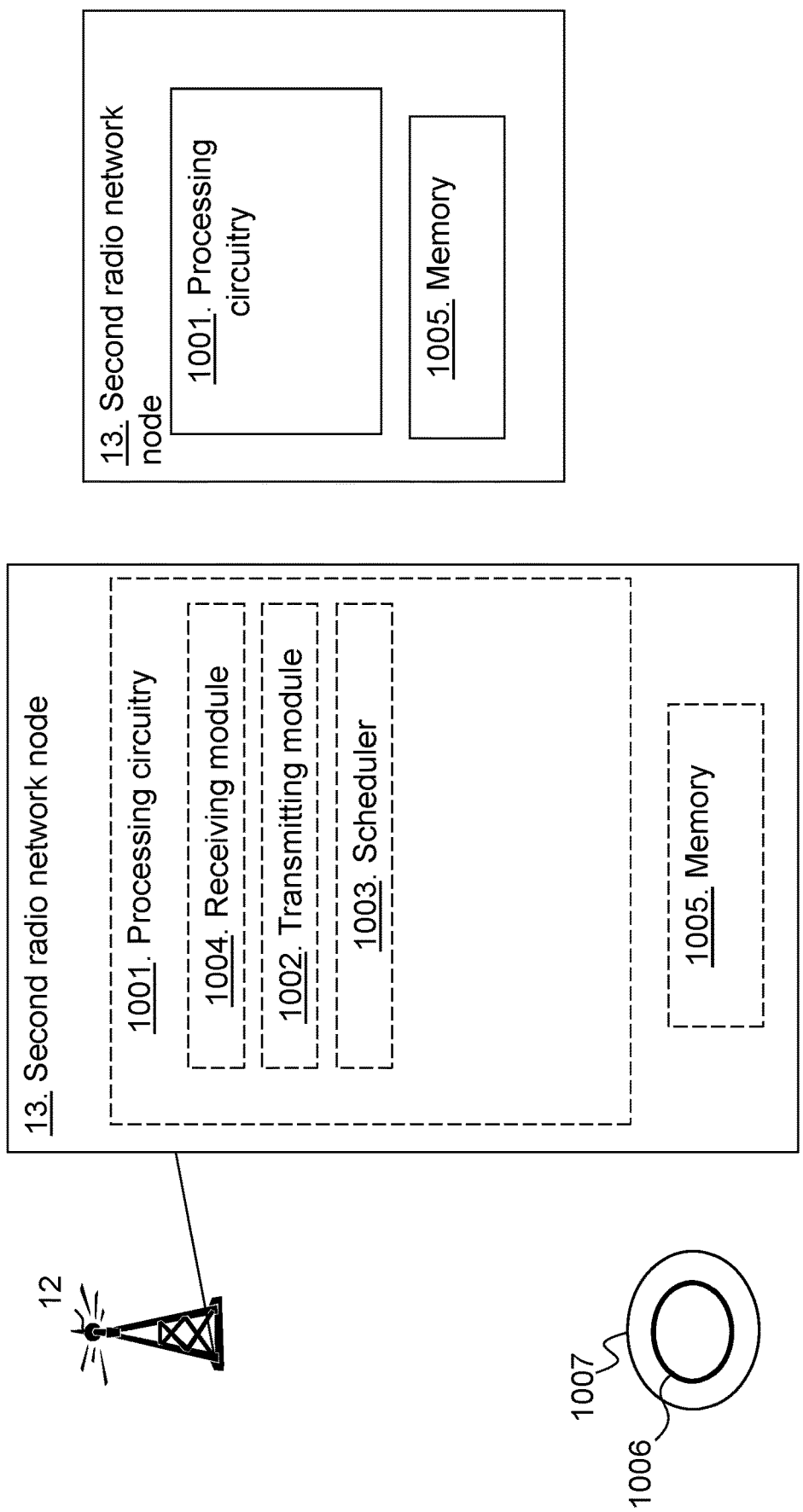
FIG. 10 is a block diagram depicting a second radio network node according to embodiments herein.

FIG. 10 is a block diagram depicting the second radio network node 13 for handling communication in the wireless communication network comprising at least the first cell and the second cell configured over at least partly the same bandwidth according to embodiments herein.

The receiving second radio network node 13 such as a radio base station or an MME may comprise processing circuitry 1001, e.g. one or more processors, configured to perform the methods herein. The first and second cell may comprise the same control channel configuration.

The second radio network node 13 may comprise a transmitting module 1002, e.g. a transmitter or transceiver. The second radio network node 13, the processing circuitry 1001 and/or the transmitting module 1002 is configured to transmit the second system information over the second cell 14, wherein the second system information comprises one or more network identities, such as PLMN IDs, and one or more access configurations, such as PRACH configurations, for the one or more network IDs. The one or more network IDs are associated to one or more services other than the service that is prioritized, and the one or more access configurations are non-overlapping one or more access configurations of the service that is prioritized.

The second radio network node 13 may comprise a scheduler 1003. The second radio network node 13, the processing circuitry 1001 and/or the scheduler 1003 may be configured to schedule resources of the second cell based on scheduled resources associated to the service that is prioritized in the first cell.

The second radio network node 13 may comprise a receiving module 1004. The second radio network node 13, the processing circuitry 1001 and/or the receiving 1004 may be configured to receive the resource indication from the first radio network node, wherein the resource indication indicates the scheduled resources, in the first cell, associated to the service that is prioritized. The second radio network node 13, the processing circuitry 1001 and/or the scheduler 1003 may be configured to schedule, based on the resource indication, resources of the second cell such as the one or more access configurations.

The second radio network node 13 further comprises a memory 1005. The memory comprises one or more units to be used to store data on, such as network IDs, resources, wireless device identities, radio network node identities, applications to perform the methods disclosed herein when being executed, and similar. Thus, the second radio network node 13 may comprise the processing circuitry and the memory, said memory comprising instructions executable by said processing circuitry whereby said radio network node is operative to perform the methods herein.

The methods according to the embodiments described herein for the second radio network node 13 are respectively implemented by means of e.g. a computer program 1006 or a computer program product 1006, comprising instructions, i.e., software code portions, which, when executed on at least one processor, cause the at least one processor to carry out the actions described herein, as performed by the second radio network node 13. The computer program product 1006 may be stored on a computer-readable storage medium 1007, e.g. a disc or similar. The computer-readable storage medium 1007, having stored thereon the computer program, may comprise the instructions which, when executed on at least one processor, cause the at least one processor to carry out the actions described herein, as performed by the second radio network node 13. In some embodiments, the computer-readable storage medium may be a non-transitory computer-readable storage medium.

Figure 11:
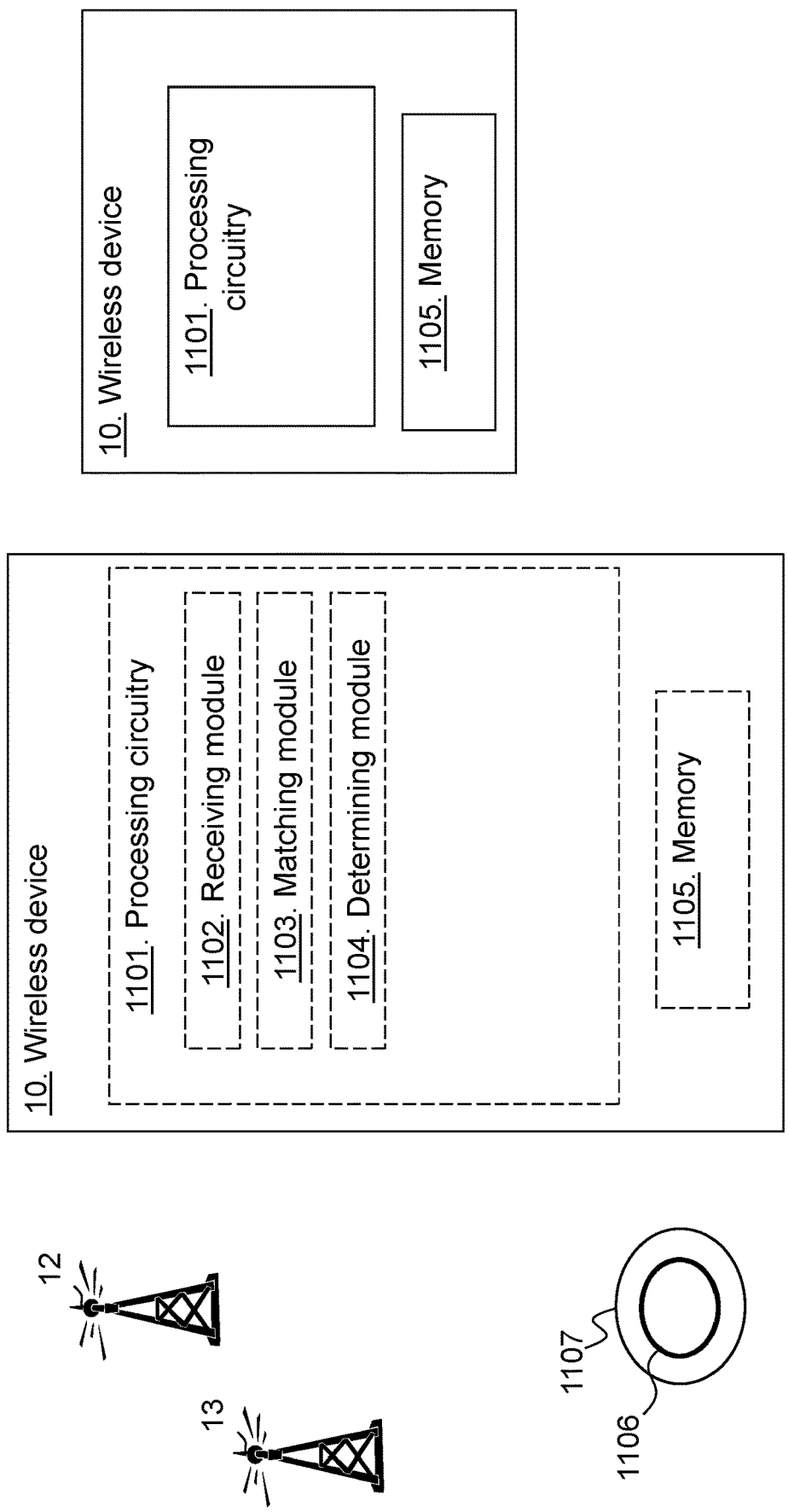
FIG. 11 is a block diagram depicting a wireless device according to embodiments herein.

FIG. 11 is a block diagram depicting the wireless device 10 for handling communication in the wireless communication network comprising at least the first cell and the second cell configured over at least partly the same bandwidth according to embodiments herein.

The wireless device 10 may comprise processing circuitry 1101, e.g. one or more processors, configured to perform the methods herein.

The wireless device 10 is associated with the one or more associated network IDs such as PLMN ID.

The wireless device may comprise a receiving module 1102, e.g. a receiver or transceiver. The wireless device 10, the processing circuitry 1101 and/or the receiving module 1102 is configured to receive, from the first radio network node 12, the first SI, wherein the first SI comprises one or more network identities such as PLMN IDs and one or more access configurations such as PRACH configurations. The first SI comprises one or more network identities, ID, and one or more access configurations for the one or more network IDs, and wherein the one or more network IDs are associated to the service that is prioritized over other services. The one or more network IDs may be one or more PLMN IDs and/or the one or more access configurations may be one or more PRACH configurations for the one or more PLMN IDs. The wireless device 10, the processing circuitry 1101 and/or the receiving module 1102 may be configured to receive the second SI, wherein the second SI comprises one or more network identities and one or more access configurations for the one or more network IDs of the second cell 14. The one or more network IDs are associated to one or more services other than the service that is prioritized and the one or more access configurations are non-overlapping one or more access configurations of the service that is prioritized.

The wireless device may comprise a matching module 1103. The wireless device 10, the processing circuitry 1101 and/or the matching module 1103 is configured to match the one or more network IDs in the first SI with the associated one or more network IDs.

The wireless device 10 may comprise a determining module 1104. The wireless device 10, the processing circuitry 1101 and/or the determining module 1104 is configured, when the associated one or more network IDs match the one or more network IDs in the first SI, use the one or more access configurations when initiating access to access the first radio network node 12 for the service that is prioritized over other services. E.g. configured to, when the IDs match, to determine to use the one or more access configurations, e.g. PRACH resources, when initiating access to accessing the first radio network node. The wireless device 10, the processing circuitry 1101 and/or the determining module 1104 may be configured to use the one or more access configurations of the second cell 14 when initiating access to access the second radio network node 13 for one or more services other than the service that is prioritized.

The wireless device 10 further comprises a memory 1105. The memory comprises one or more units to be used to store data on, such as network IDs, resources, wireless device identities, radio network node identities, applications to perform the methods disclosed herein when being executed, and similar. Thus, the wireless device 10 may comprise the processing circuitry and the memory, said memory comprising instructions executable by said processing circuitry whereby said wireless device is operative to perform the methods herein.

The methods according to the embodiments described herein for the wireless device 10 are respectively implemented by means of e.g. a computer program 1106 or a computer program product 1106, comprising instructions, i.e., software code portions, which, when executed on at least one processor, cause the at least one processor to carry out the actions described herein, as performed by the wireless device 10. The computer program product 1106 may be stored on a computer-readable storage medium 1107, e.g. a disc or similar. The computer-readable storage medium 1107, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes will appreciate the cost, performance, and maintenance trade-offs inherent in these design choices.

It is herein disclosed a method performed by a first radio network node for handling communication of a wireless device in a wireless communication network. The first radio network node transmits first system information (SI) over a first cell, which first system information comprises one or more network identities, such as PLMN IDs, and one or more access configurations, such as Physical Random Access Channel (PRACH) configurations. The one or more network IDs are associated to a service that is prioritized over other services.

It is herein disclosed a method performed by a second radio network node for handling communication in a wireless communication network. The second radio network node transmits second system information over a second cell, wherein the second system information comprises one or more network identities, such as PLMN IDs, and one or more access configurations, such as PRACH configurations. The one or more network IDs are associated to one or more services other than a service that is prioritized. The second radio network node may schedule resources of the second cell based on scheduled resources associated to the service that is prioritized. For example, the second radio network node may receive a resource indication from a first radio network node wherein the resource indication indicates the scheduled resources associated to the service that is prioritized and based on the resource indication schedule resources of the second cell such as the one or more access configurations.

It is herein disclosed a method performed by a wireless device for handling communication in a wireless communication network. The wireless device is associated with one or more associated network IDs such as PLMN ID. The wireless device receives, from a first radio network node, a first SI, which first SI comprises one or more network identities such as PLMN IDs and one or more access configurations such as PRACH configurations. The one or more network IDs are associated to a service that is prioritized over other services. The wireless device, when the associated one or more network IDs matches the one or more network ID in the first SI, determines to use or uses the one or more access configurations, e.g. PRACH resources, when initiating access to accessing the first radio network node.

It is herein disclosed a first radio network node configured to perform the method herein.

It is herein disclosed a second radio network node configured to perform the method herein.

It is herein disclosed a wireless device configured to perform the method herein.

Figure 12:
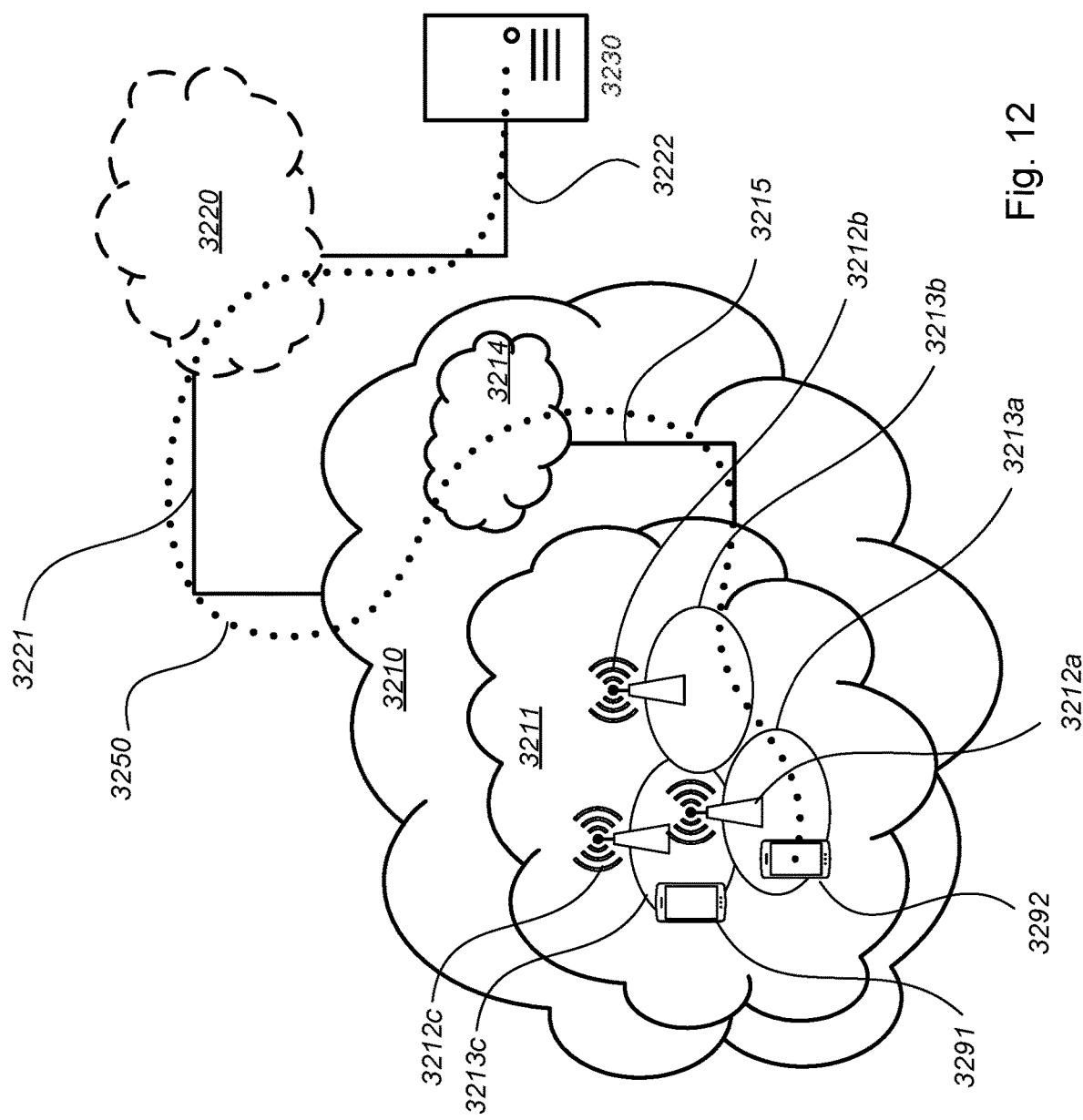
FIG. 12 schematically illustrates a telecommunication network connected via an intermediate network to a host computer.

With reference to FIG. 12, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network nodes herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the wireless device 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 12 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 13. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 13) served by the base station 3320. The communication interface 3326 may be configured to facilitate a connection 3360 to the host computer 3310. The connection 3360 may be direct or it may pass through a core network (not shown in FIG. 13) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 13:
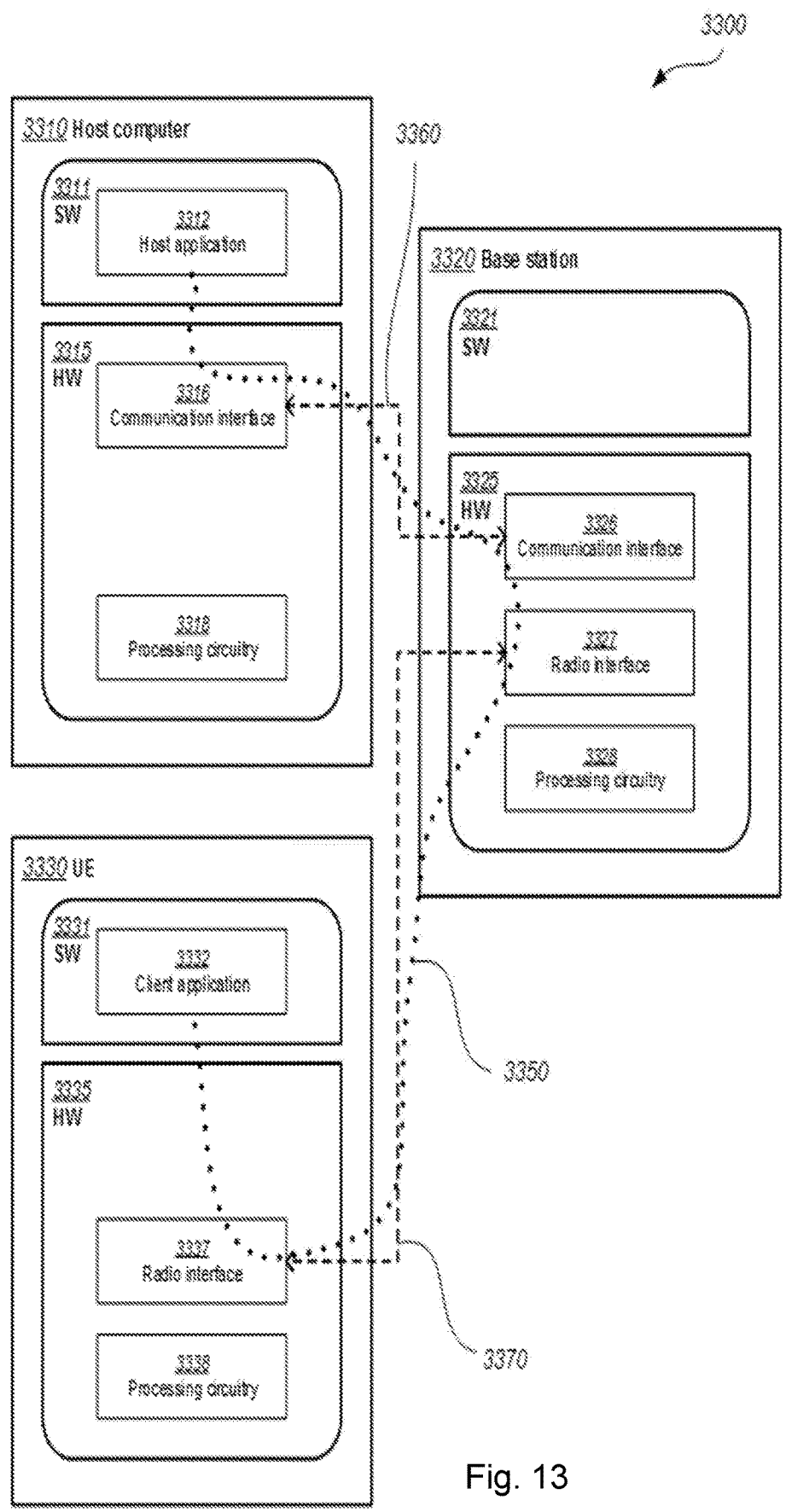
FIG. 13 is a generalized block diagram of a host computer communicating via a base station with a user equipment over a partially wireless connection.

It is noted that the host computer 3310, base station 3320 and UE 3330 illustrated in FIG. 13 may be identical to the host computer 3230, one of the base stations 3212a, 3212b, 3212c and one of the UEs 3291, 3292 of FIG. 12, respectively. This is to say, the inner workings of these entities may be as shown in FIG. 13 and independently, the surrounding network topology may be that of FIG. 12.

In FIG. 13, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve using prioritized services and thereby provide benefits such as reduced user waiting time, and better responsiveness.

A measurement procedure may be provided for the purpose of monitoring data rate, latency and other factors on which the one or more embodiments improve. There may further be optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 14, 15:
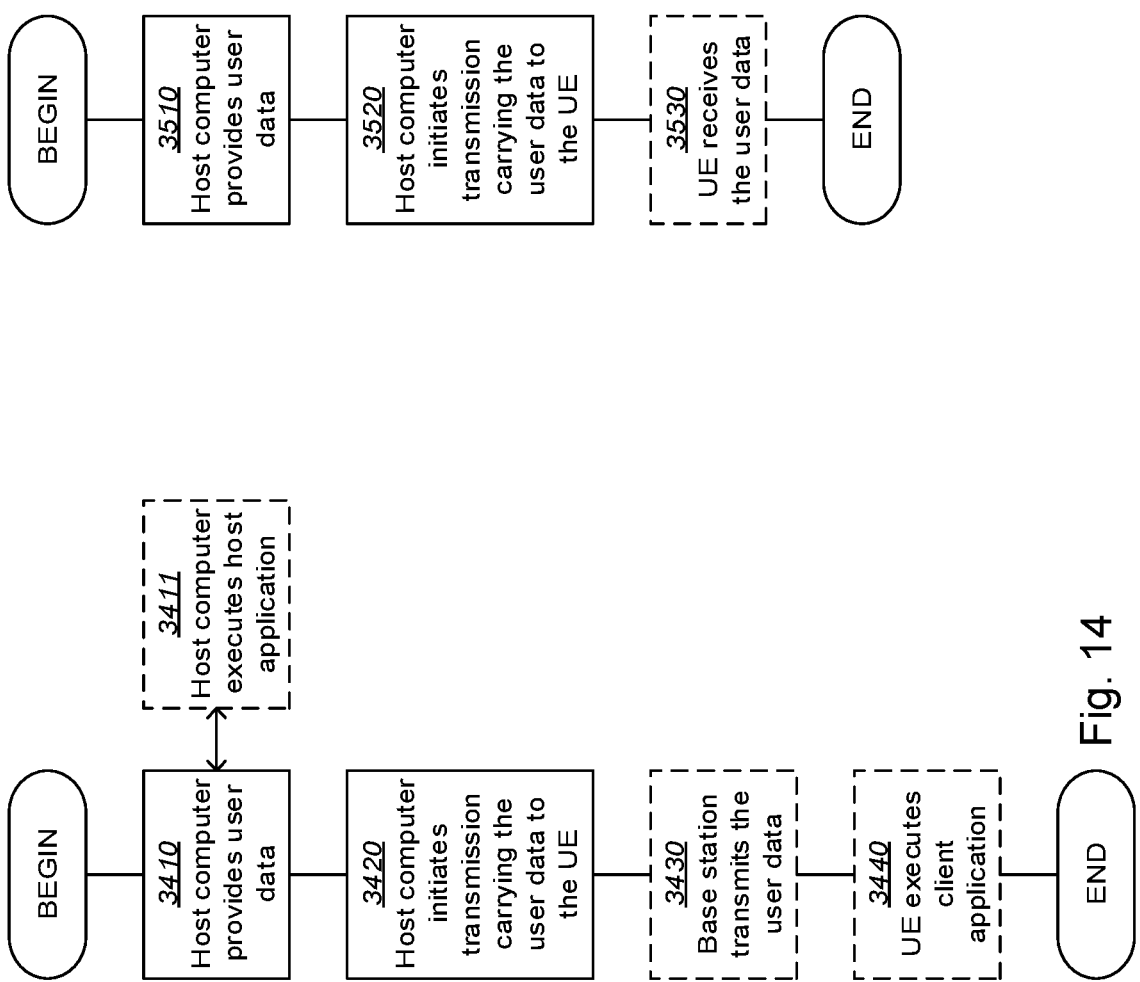

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a first radio network node for handling communication of a wireless device in a wireless communication network comprising at least a first cell and a second cell configured over at least partly a same bandwidth, the method comprising:
   transmitting a first system information, SI, over the first cell, wherein the first SI comprises one or more network identities, IDs, and an access configuration for each of the one or more network IDs, respectively, and wherein at least one of the one or more network IDs is associated with a service that is prioritized over other services;
   scheduling resources associated with the service that is prioritized; and
   transmitting a resource indication to a second radio network node, wherein the resource indication indicates the scheduled resources associated with the service that is prioritized.

2. The method according to claim 1, wherein each of the one or more network IDs is a public land mobile network, PLMN, ID, respectively, and/or the access configuration for each of the one or more network IDs is a Physical Random Access Channel, PRACH, configuration.

3. A computer program product comprising instructions, which, when executed on at least one processor, causes the at least one processor to carry out the method according to claim 1, as performed by the first radio network node or the wireless device.

4. A computer-readable storage medium, having stored thereon a computer program product comprising instructions which, when executed on at least one processor, cause the at least one processor to carry out the method according to claim 1, as performed by the first radio network node or the wireless device.

5. A method performed by a second radio network node for handling communication of a wireless device in a wireless communication network comprising at least a first cell and a second cell configured over at least partly a same bandwidth, the method comprising:
   transmitting a second system information, SI, over the second cell, wherein the second SI comprises one or more network identities, IDs, and an access configuration for each of the one or more network IDs, respectively, and wherein the one or more network IDs are associated with one or more services, other than a service that is prioritized, and the access configuration is non-overlapping any access configuration of the service that is prioritized.

6. The method according to claim 5, wherein each of the one or more network IDs is a public land mobile network, PLMN, ID, respectively, and/or the access configuration for each of the one or more network IDs is a Physical Random Access Channel, PRACH, configuration.

7. The method according to claim 5, further comprising:
   scheduling resources of the second cell based on scheduled resources associated with the service that is prioritized in the first cell.

8. The method according to claim 7, further comprising:
   receiving a resource indication from a first radio network node, wherein the resource indication indicates scheduled resources in the first cell associated with the service that is prioritized, and based on the resource indication, the second radio network node schedules resources of the second cell.

9. The method according to claim 5, wherein the first and second cell comprise a same control channel configuration.

10. A method performed by a wireless device for handling communication in a wireless communication network comprising at least a first cell and a second cell configured over at least partly a same bandwidth, wherein the wireless device is associated with one or more associated network identities, IDs, the method comprising:
    receiving, from a first radio network node, a first system information, SI, wherein the first SI comprises one or more network identities, IDs, and an access configuration for each of the one or more network IDs, respectively, and wherein at least one of the one or more network IDs is associated with a service that is prioritized over other services; and
    when the associated one or more network IDs of the wireless device match the one or more network IDs in the first SI,
    using, when initiating access, the access configuration for the at least one of the one or more network IDs associated with the service that is prioritized over other services, to access the first radio network node for the service that is prioritized over other services.

11. The method according to claim 10, wherein each of the one or more network IDs is a public land mobile network, PLMN, ID, respectively, and/or the access configuration is a Physical Random Access Channel, PRACH, configuration.

12. The method according to claim 10, further comprising:
    matching the one or more network IDs in the first SI with the associated one or more network IDs of the wireless device.

13. The method according to claim 10, further comprising:
    receiving, from a second radio network node, a second system information, SI, wherein the second SI comprises one or more network identities, IDs, and an access configuration for each of the one or more network IDs of the second cell, respectively, and wherein the one or more network IDs are associated with one or more services other than the service that is prioritized, and the access configuration is non-overlapping any access configuration of the service that is prioritized; and using, when initiating access, the access configuration of the second cell to access the second radio network node for one or more services other than the service that is prioritized.

14. A first radio network node for handling communication of a wireless device in a wireless communication network comprising at least a first cell and a second cell configured over at least partly a same bandwidth, wherein the first radio network node is configured to:
   transmit a first system information, SI, over the first cell, wherein the first SI comprises one or more network identities, IDs, and an access configuration for each of the one or more network IDs, respectively, and wherein at least one of the one or more network IDs is associated with a service that is prioritized over other services;
   schedule resources associated with the service that is prioritized; and
   transmit a resource indication to a second radio network node, wherein the resource indication indicates the scheduled resources associated with the service that is prioritized.

15. The first radio network node according to claim 14, wherein each of the one or more network IDs is a public land mobile network, PLMN, ID, and/or the access configuration is a Physical Random Access Channel, PRACH, configuration.

16. A second radio network node for handling communication of a wireless device in a wireless communication network comprising at least a first cell and a second cell configured over at least partly a same bandwidth, wherein the second radio network node is configured to:
   transmit a second system information, SI, over the second cell, wherein the second SI comprises one or more network identities, IDs, and an access configuration for each of the one or more network IDs, respectively, and wherein the one or more network IDs are associated with one or more services other than a service that is prioritized, and the access configuration is non-overlapping any access configuration of the service that is prioritized.

17. The second radio network node according to claim 16, wherein each of the one or more network IDs is public land mobile network, PLMN, ID, and/or the access configuration is a Physical Random Access Channel, PRACH, configuration.

18. The second radio network node according to claim 16, wherein the second radio network node is further configured to:
   schedule resources of the second cell based on scheduled resources associated with the service that is prioritized in the first cell.

19. The second radio network node according to claim 18, wherein the second radio network node is further configured to:
   receive a resource indication from a first radio network node, wherein the resource indication indicates scheduled resources in the first cell associated with the service that is prioritized, and based on the resource indication, the second radio network node is configured to schedule resources of the second cell.

20. The second radio network node according to claim 16, wherein the first and second cell comprise a same control channel configuration.

21. A wireless device for handling communication in a wireless communication network comprising at least a first cell and a second cell configured over at least partly a same bandwidth, wherein the wireless device is associated with one or more associated network identities, IDs, wherein the wireless device is configured to:
   receive from a first radio network node, a first system information, SI, wherein the first SI comprises one or more network identities, IDs, and an access configuration for each of the one or more network IDs, respectively, and wherein at least one of the one or more network IDs is associated with a service that is prioritized over other services; and
   when the associated one or more network IDs of the wireless device match the one or more network IDs in the first SI, use, when initiating access, the access configuration for the at least one of the one or more network IDs associated with the service that is prioritized over other services to access the first radio network node for the service that is prioritized over other services.

22. The wireless device according to claim 21, wherein each of the one or more network IDs is a public land mobile network, PLMN, ID, respectively, and/or the access configuration is a Physical Random Access Channel, PRACH configuration.

23. The wireless device according to claim 21, wherein the wireless device is further configured to:
   match the one or more network IDs in the first SI with the associated one or more network IDs of the wireless device.

24. The wireless device according to claim 21, wherein the wireless device is further configured to:
   receive from a second radio network node, a second system information, SI, wherein the second SI comprises one or more network identities, IDs, and an access configuration for each of the one or more network IDs of the second cell, respectively, and wherein the one or more network IDs are associated with one or more services, other than the service that is prioritized, and the access configuration is non-overlapping any access configuration of the service that is prioritized; and
   use, when initiating access, the access configuration of the second cell to access the second radio network node for the one or more services other than the service that is prioritized.

25. A first radio network node comprising processing circuitry configured to:
   transmit a first system information, SI, over a first cell of a wireless communication network comprising at least the first cell and a second cell configured over at least partly a same bandwidth, wherein the first SI comprises one or more network identities, IDs, and an access configuration for each of the one or more network IDs, respectively, and wherein at least one of the one or more network IDs is associated with a service that is prioritized over other services;
   schedule resources associated with the service that is prioritized; and
   transmit a resource indication to a second radio network node, wherein the resource indication indicates the scheduled resources associated with the service that is prioritized.

26. A second radio network node comprising processing circuitry configured to:
   transmit a second system information, SI, over a second cell of a wireless communication network comprising at least a first cell and the second cell configured over at least partly a same bandwidth, wherein the second SI comprises one or more network identities, IDs, and an access configuration for each of the one or more network IDs, respectively, and wherein the one or more network IDs are associated with one or more services, other than a service that is prioritized, and the access configuration is non-overlapping any access configuration of the service that is prioritized.

27. A wireless device comprising processing circuitry configured to:

receive, from a first radio network node of a wireless communication network comprising at least a first cell and a second cell configured over at least partly a same bandwidth, a first system information, SI, wherein the first SI comprises one or more network identities, IDs, and an access configuration for each of the one or more network IDs, respectively, and wherein at least one of the one or more network IDs is associated with a service that is prioritized over other services; and wherein the wireless device is associated with one or more associated network IDs, and when the associated one or more network IDs of the wireless device match the one or more network IDs in the first SI, the processing circuitry is configured to use, when initiating access, the access configuration for the at least one of the one or more network IDs associated with the service that is prioritized over other services to access the first radio network node for the service that is prioritized over other services.

* * * * *